(12) United States Patent
Takigawa

(10) Patent No.: US 11,201,860 B2
(45) Date of Patent: Dec. 14, 2021

(54) INFORMATION PROCESSING SYSTEM, INFORMATION PROCESSING APPARATUS, AND DATA OUTPUT APPARATUS

(71) Applicant: Minako Takigawa, Tokyo (JP)

(72) Inventor: Minako Takigawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 598 days.

(21) Appl. No.: 15/992,325

(22) Filed: May 30, 2018

(65) Prior Publication Data

US 2018/0367520 A1    Dec. 20, 2018

(30) Foreign Application Priority Data

Jun. 14, 2017    (JP) .............................. JP2017-116739

(51) Int. Cl.
*H04L 29/06*    (2006.01)
*H04N 1/00*    (2006.01)
(Continued)

(52) U.S. Cl.
CPC ......... *H04L 63/08* (2013.01); *H04N 1/00204* (2013.01); *H04N 1/00244* (2013.01);
(Continued)

(58) Field of Classification Search
CPC ..... H04L 63/08; H04L 2463/082; H04L 1/44; H04L 1/4406; H04L 1/4413;
(Continued)

(56) References Cited

U.S. PATENT DOCUMENTS 8,670,145 B2 *   3/2014   Asai ................... H04N 1/00225
                                                            358/1.15
9,124,846 B2 *   9/2015   Hansen .............. H04N 1/00228
(Continued)

FOREIGN PATENT DOCUMENTS

EP          3142343 A1    3/2017
JP       2004-112798 A    4/2004
(Continued)

OTHER PUBLICATIONS

Extended European Search Report dated Oct. 2, 2018.

*Primary Examiner* — Linglan E Edwards
(74) *Attorney, Agent, or Firm* — Harness, Dickey & Pierce, P.L.C.

(57) ABSTRACT

An information processing system includes a data output apparatus and an information processing apparatus. The data output apparatus includes processors and memories to store instructions which cause the processors to receive a first authentication information, request authentication based on the first authentication information, and transmit the first authentication information authenticated in response to the authentication request and a transmission request of information indicating storage locations to store data output from the data output apparatus. The information processing apparatus includes processors and memories to store instructions which cause the processors to receive a second authentication information, request authentication based on the second authentication information, determine whether the second authentication information authenticated in response to the authentication request and the first authentication information transmitted from the data output apparatus have a predetermined relationship, and transmit information indicating the storage locations when the first and the second authentication information have the predetermined relationship.

5 Claims, 11 Drawing Sheets

(51) Int. Cl.
  *H04N 1/44* (2006.01)
  *G06F 3/12* (2006.01)
  *H04N 1/32* (2006.01)

(52) U.S. Cl.
  CPC .......... *G06F 3/1222* (2013.01); *G06F 3/1238* (2013.01); *G06F 3/1285* (2013.01); *H04L 2463/082* (2013.01); *H04N 1/324* (2013.01); *H04N 1/44* (2013.01); *H04N 1/4406* (2013.01); *H04N 1/4413* (2013.01); *H04N 1/4426* (2013.01); *H04N 1/4433* (2013.01)

(58) Field of Classification Search
  CPC . H04L 1/4426; H04L 1/4433; H04L 1/00204; H04L 1/00244; G06F 21/60; G06F 21/608; G06F 3/1222; G06F 3/1238; G06F 3/1285
  See application file for complete search history.

(56) References Cited

U.S. PATENT DOCUMENTS

| | | | | |
|---|---|---|---|---|
| 9,143,655 | B2* | 9/2015 | Ichikawa | H04N 1/4426 |
| 9,275,205 | B2* | 3/2016 | Kamei | G06F 21/608 |
| 9,733,875 | B2* | 8/2017 | Sone | H04N 1/00127 |
| 10,216,946 | B2* | 2/2019 | Ryu | G06F 3/1238 |
| 2002/0143922 | A1 | 10/2002 | Tanimoto | |
| 2005/0094195 | A1* | 5/2005 | Sakamoto | G06F 21/33 358/1.15 |
| 2009/0064289 | A1* | 3/2009 | Jang | G06F 21/33 726/4 |
| 2010/0079785 | A1* | 4/2010 | Emori | H04L 67/12 358/1.14 |
| 2012/0042359 | A1* | 2/2012 | Kuroda | G06F 21/41 726/3 |
| 2013/0342866 | A1* | 12/2013 | Hansen | H04N 1/4413 358/1.14 |
| 2014/0189170 | A1 | 7/2014 | Takigawa | |
| 2014/0240746 | A1* | 8/2014 | Ichikawa | H04N 1/4413 358/1.14 |
| 2015/0015909 | A1* | 1/2015 | Kaida | G06F 21/608 358/1.14 |
| 2015/0103370 | A1 | 4/2015 | Takigawa | |

FOREIGN PATENT DOCUMENTS

| | | |
|---|---|---|
| JP | 2008-072517 | 3/2008 |
| JP | 2009-134613 | 6/2009 |
| JP | 2011-217322 | 10/2011 |

* cited by examiner

INFORMATION PROCESSING SYSTEM, INFORMATION PROCESSING APPARATUS, AND DATA OUTPUT APPARATUS

CROSS-REFERENCE TO RELATED APPLICATION

This patent application is based on and claims priority pursuant to 35 U.S.C. § 119 to Japanese Patent Application No. 2017-116739, filed on Jun. 14, 2017 in the Japanese Patent Office, the entire disclosure of which is hereby incorporated by reference herein.

BACKGROUND

Technical Field

The present disclosure relates to an information processing system, an information processing apparatus, and a data output apparatus.

Description of the Related Art

As one of known data output apparatuses that output data according to a user operation, there is a scanner that reads an original image and outputs scan data read from the original image. Generally, when the scanner reads the original image into scan data, the scan data is stored in a memory of the scanner for later use. When the scanner is connected to a network, it is possible to transfer the scan data to another information device such as a computer via the network. As methods of transferring scan data, there are known methods, for example, attaching scan data to an e-mail and transmitting the scan data to a mail box of a user who operates the scanner, and saving scan data in a shared folder shared on the network.

SUMMARY

This specification describes an improved information processing system that includes a data output apparatus and an information processing apparatus. The data output apparatus includes a data output apparatus and an information processing apparatus. The data output apparatus includes one or more processors and one or more memories to store a plurality of instructions which, when executed by the processors, cause the processors to receive a first authentication information of a user, request authentication based on the first authentication information, and transmit, to the information processing apparatus, the first authentication information authenticated in response to the authentication request and a transmission request that requests transmission of information indicating one or more storage locations to store data output from the data output apparatus. The information processing apparatus includes one or more processors and one or more memories to store a plurality of instructions which, when executed by the processors, cause the processors to receive a second authentication information, request authentication based on the second authentication information, determine whether the second authentication information authenticated in response to the authentication request and the first authentication information transmitted from the data output apparatus have a predetermined relationship, and transmit information indicating the one or more storage locations to the data output apparatus based on a determination that the first authentication information and the second authentication information have the predetermined relationship.

This specification further describes an improved information processing apparatus that includes one or more processors and one or more memories to store a plurality of instructions which, when executed by the processors, cause the processors to receive, from a data output apparatus, first authentication information authenticated in response to an authentication request, the first authentication information having been input to a data output apparatus and a transmission request to request a transmission of information indicating one or more storage locations to store data output from the data output apparatus, request an authentication according to the inputted second authentication information, and transmit information indicating the one or more storage locations in response to the transmission request and the first authentication information received from the data output apparatus, based on a determination that the first authentication information and the second authentication information authenticated in response to the authentication request according to the input second authentication information have the predetermined relationship.

This specification still further describes a data output apparatus that includes one or more processors and one or more memories to store a plurality of instructions which, when executed by the processors, cause the processors to request an authentication according to the first authentication information that is input to the data output apparatus, transmit, to an information processing apparatus, the first authentication information authenticated in response to the authentication request and a transmission request of information that indicates one or more storage locations to store data output from the data output apparatus, and transmit the data output from the data output apparatus to the one or more storage locations indicated by the information indicating the one or more storage locations transmitted from the information processing apparatus in response to the transmission request.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
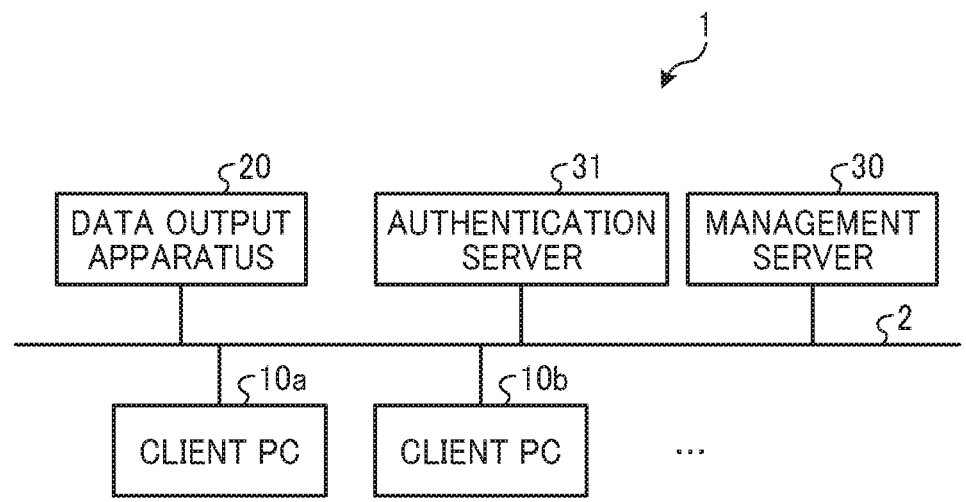
FIG. 1 is a block diagram illustrating a network configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference codes are allocated to elements (members or components) having the same function or shape and redundant descriptions thereof are omitted below.

Overview of Information Processing System

FIG. 1 illustrates an information processing system according to an embodiment of the present disclosure. In FIG. 1, the information processing system 1 includes client computers (client PCs) 10a, 10b, . . . , a data output apparatus 20, and a management server 30, all of which are connected to a network 2. The information processing system 1 may further include an authentication server 31 connected to the network 2.

Each of the client PCs 10a, 10b, . . . is used by a user and connected to the network 2 by wired or wireless communication. The management server 30 manages the information of the respective client PCs 10 a, 10 b, . . . . For example, the management server 30 manages connection information for connecting the client PCs 10a, 10b, . . . each other via the network 2 and user information indicating the user using the client PCs 10a, 10b, . . . in association with each other.

The data output apparatus 20 is an information apparatus that outputs data according to, for example, a user's operation. The data output apparatus 20 may be a multifunction peripheral (MFP) having a plurality of functions such as a printer function, a scanner function, a copy function, a FAX function in one apparatus body. The data output apparatus 20 may be a scanner simply having a scanner function. The data output apparatus 20 is not only above. The data output apparatus 20 may be an imaging device that outputs an image including a still image and a moving image as image data and an electronic blackboard that can output an image drawn in a certain area of a surface of the electronic blackboard, called a drawing area, as image data. The data output apparatus 20 may be a sound recorder that records sound and outputs the recorded sound as sound data. Furthermore, the data output apparatus 20 may be a tablet device capable of outputting characters or the like handwritten by a touch pen, a finger or the like as image data.

In the following description, it is assumed that the data output apparatus 20 is the MFP.

The authentication server 31 authenticates the users logging in to the data output apparatus 20 and the client PCs 10a, 10b, . . . . For example, the client PC 10a requests the user to input user information in order to perform the login process of the user who uses the output data device. The client PC 10a generates authentication information based on user information input and transmits the generated authentication information to the authentication server 31. The authentication server 31 performs authentication processing based on the authentication information transmitted from the client PC 10a and transmits an authentication result indicating success or failure of authentication to the client PC 10a. When the authentication result indicates success of the authentication, the client PC 10a permits the user who has inputted the user information, and the login process is completed.

The information processing system 1 having the above described configuration according to the embodiment can directly store data output from the data output apparatus 20 according to the user's operation to, for example, a folder specified by the user in the client PC 10a and ensures security.

Detailed Configuration of the Information Processing System

Figure 2:
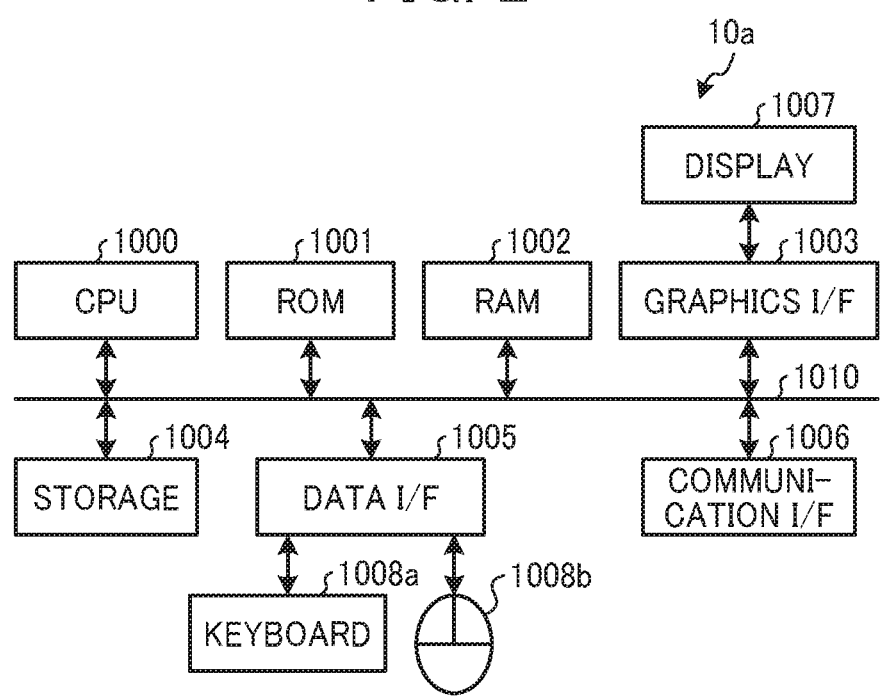
FIG. 2 is a block diagram illustrating a hardware configuration of a client personal computer (hereinafter referred as the client PC) of FIG. 1 according to the embodiment.

Detailed configuration of the information processing system according to the embodiment is described. FIG. 2 is a hardware configuration of a client PC 10a, 10b, according to the embodiment. Since the same configuration can be applied to the client PCs 10a, 10b, . . . , hereinafter, any one or more of the client PCs 10a, 10b, . . . are collectively represented as the client PC 10a unless otherwise noted.

In FIG. 2, the client PC 10a includes a central processing unit (CPU) 1000, a read only memory (ROM) 1001, a random-access memory (RAM) 1002, a graphics interface (I/F) 1003, a memory 1004, a data I/F 1005, and a communication I/F 1006, which are communicably connected to each other via a bus 1010.

The memory 1004 may be a non-volatile storage medium to store data, such as a hard disk drive, a flash memory, or the like. The memory 1004 stores a program and data used for operating the CPU 1000.

The CPU 1000 controls overall operation of the client PC 10a according to a program stored in advance, for example, in the ROM 1001 or the memory 1004 by using the RAM 1002 as a working memory. The graphics I/F 1003 generates a display signal that can be processed with the display 1007 based on a display control signal generated by the CPU 1000 according to the program. The display 1007 displays a screen according to the display signal provided from the graphics I/F 1003.

The data I/F 1005 sends and receives data to and from an external device. The data I/F 1005 may be, for example, a universal serial bus (USB). In this example, the data I/F 1005 is connected to a keyboard 1008a and a pointing device 1008b as input devices that accept user input. The communication I/F 1006 controls communication in association with the network 2 according to an instruction of the CPU 1000.

Figure 3:
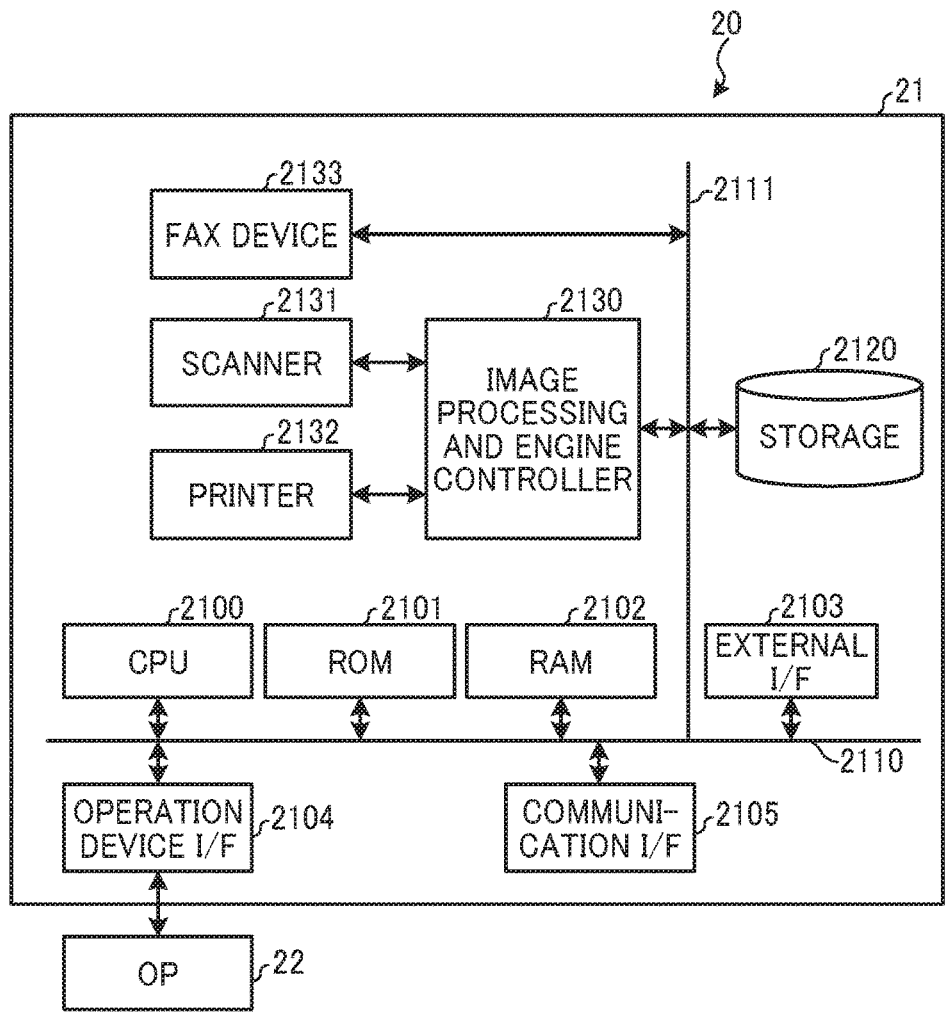
FIG. 3 is a block diagram illustrating a hardware configuration of a multifunction printer (MFP) of FIG. 1 as a data output apparatus according to the embodiment.

FIG. 3 illustrates an example of a hardware configuration of the MFP as the data output apparatus 20 according to the embodiment. In FIG. 3, a main body 21 of the MFP as the data output apparatus 20 includes a CPU 2100, a ROM 2101, a RAM 2102, an external device I/F 2103, an operation device I/F 2104, a communication I/F 2105, and a memory 2120. Additionally, the data output apparatus 20 is configured to execute each function of the data output apparatus 20.

The memory 2120 may be a non-volatile storage medium to store data, such as a hard disk drive, a flash memory, or the like. The memory 2120 stores a program and data used for operating the CPU 2100. The memory 2120 may store an application described above to execute a predetermined function in the data output apparatus 20.

This example of the data output apparatus 20, which has the functions of printing, copying, scanning, and fax communication, includes an image processing and engine controller 2130, a scanner 2131, a printer 2132, and a facsimile (FAX) device 2133 to perform the respective functions. The above described units included in the data output apparatus 20 are communicably connected to each other through buses 2110 and 2111.

The CPU 2100 controls overall operation of the data output apparatus 20 according to a program stored in advance, for example, in the ROM 2101 or the memory 2120 by using the RAM 2102 as a working memory.

The operation device I/F 2104 is an interface to connect the operation panel (OP) 22. The OP 22 includes an operation receiving section that receives a user operation and an operation panel as an operation section including a display that displays information to the user. A signal output from the OP 22 in response to a user operation is supplied to the CPU 2100 via the operation device I/F 2104.

The communication I/F 2105 controls communication via the network 2 according to an instruction of the CPU 2100. For example, a print job output from the client PC 10a is transmitted from the communication I/F 2105 to the main body 21 via the network 2. The external device I/F 2103 is an interface for connecting external devices such as a USB interface.

The scanner 2131 scans and reads an image of an original document set on a document table using an optical sensor, such as a contact image sensor (CIS), and outputs image data. The printer 2132 forms an image on a medium based on the image data by using an image forming method, such as an inkjet printing method or an electrophotographic printing method.

The image processing and engine controller 2130 controls the scanner 2131 and the printer 2132 according to the instruction of the CPU 2100. Additionally, the image processing and engine controller 2130 performs predetermined image processing on the image data read with the scanner 2131 to be output to the bus 2111 according to the instruction of the CPU 2100. The image processing and engine controller 2130 also performs the predetermined image processing on the image data provided via the bus 2111 to be provided to the printer 2132. The FAX device 2133 is connected, for example, to a public telephone line, and performs fax transmission processing on the image data provided through the bus 2111 according to the instruction of the CPU 2100.

Figure 4:
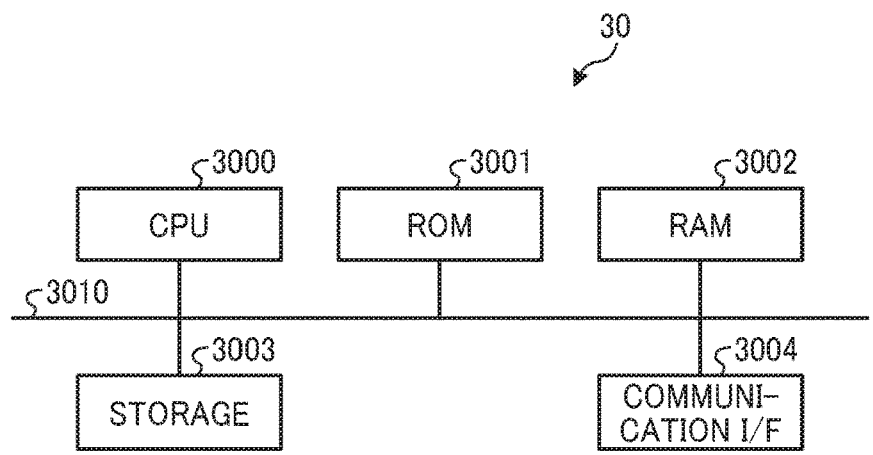
FIG. 4 is a schematic block diagram illustrating a hardware configuration of a management server of FIG. 1 according to the embodiment.

FIG. 4 illustrates an example of a hardware configuration of a management server 30 according to the embodiment. In FIG. 4, the management server 30 includes a CPU 3000, a ROM 3001, a RAM 3002, a memory 3003, and a communication I/F 3004, which are connected via a bus 3010 so that they can communicate with each other.

The memory 3003 may be a non-volatile storage medium to store data, such as a hard disk drive. Instead of the hard disk drive, the memory 3003 may be a nonvolatile semiconductor memory such as a flash memory. The memory 3003 stores a program and various data to be executed by the CPU 3000. In FIG. 4, the memory 3003 is configured as a single piece of hardware, but is not limited thereto. For example, the memory 3003 may be a plurality of storage devices that is comprehensively managed as one memory 3003.

The CPU 3000 controls overall operation of the management server 30 according to a program stored in the ROM 3001 and the memory 3003 by using the RAM 3002 as a working memory. The communication I/F 3004 performs communication via the network 2 under the control of the CPU 3000.

In FIG. 1, the management server 30 is configured as a single piece of hardware, but is not limited thereto. A plurality of server devices having the same configuration may be comprehensively controlled as the management server 30. Since the authentication server 31 in FIG. 1 may have the same configuration as that of the management server 30, an explanation of the configuration is omitted. Although FIG. 1 illustrates the management server 30 and the authentication server 31 as different hardware, this is not limited to this example. For example, it is also possible that the management server 30 in FIG. 4 has a function as the authentication server 31.

Figure 5:
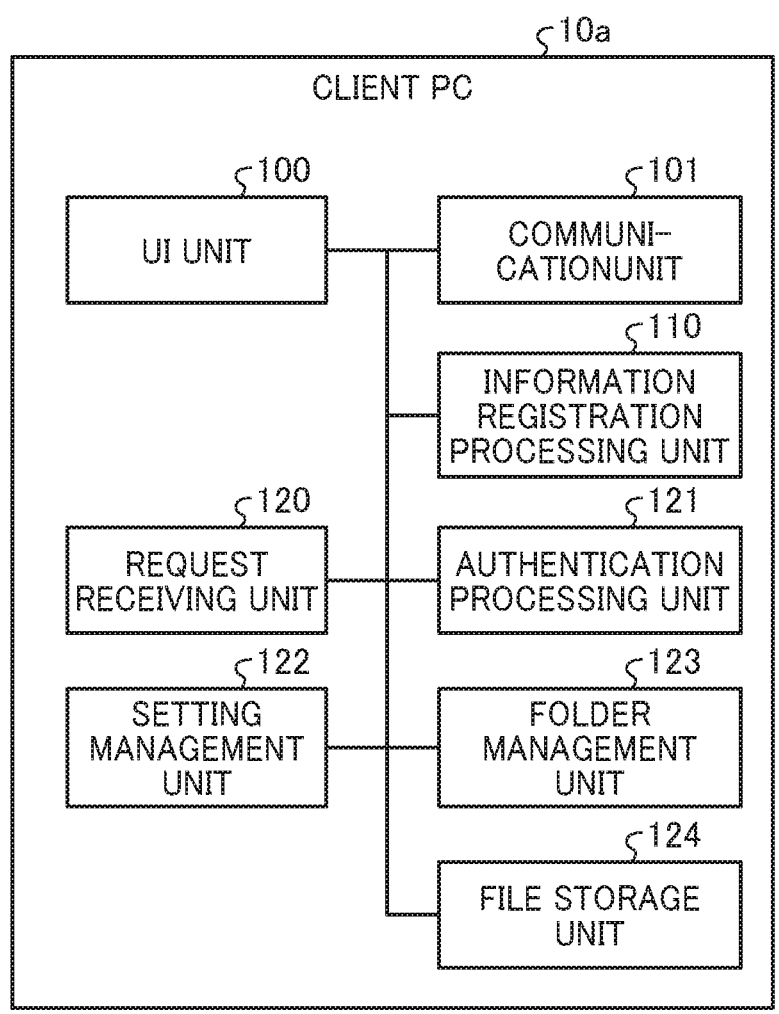
FIG. 5 is a functional block diagram illustrating functions of the client PC according to the embodiment.

FIG. 5 is a functional block diagram illustrating functions of the client PC 10a according to the embodiment. In FIG. 5, the client PC 10a includes a user interface (UI) unit 100, a communication unit 101, an information registration processing unit 110, a request receiving unit 120, an authentication processing unit 121, a setting management unit 122, a folder management unit 123, and a file storage unit 124.

The UI unit 100, the communication unit 101, the information registration processing unit 110, the request receiving unit 120, the authentication processing unit 121, the setting management unit 122, the folder management unit 123, and the file storage unit 124 are implemented by an information processing program according to the embodiment executed by the CPU 1000. Alternatively, some or all of the UI unit 100, the communication unit 101, the information registration processing unit 110, the request receiving unit 120, the authentication processing unit 121, the setting management unit 122, the folder management unit 123, and the file storage unit 124 may be configured as hardware to operate in conjunction with each other.

The UI unit 100 performs processing to display a menu and an information display screen on the display 1007. In addition, the UI unit 100 accepts user operations such as data input and operation instructions according to the menu. The communication unit 101 controls the communication I/F 1006 to communicate with the network 2.

The information registration processing unit 110 transmits the user information for identifying the user who uses the client PC 10a and the connection information for connecting the client PC 10a and the information registration processing unit 110 via the network 2 to the management server 30, and requests the management server 30 to register the user information and the connection information. The connection information includes, for example, address information indicating an address of the client PC 10a on the network 2 and a host name of the client PC 10a on the network 2. An Internet Protocol (IP) address of the client PC may be used as the address information when the network 2 corresponds to Transmission Control Protocol/Internet Protocol (TCP/IP).

The request receiving unit 120 receives information transmissions and information requests that are transmitted from the data output apparatus 20. The request receiving unit 120 analyzes the content of the accepted information transmission and information request, and requests processing corresponding to each part of the client PC 10a based on the analysis result. The request receiving unit 120 returns the result of the processing corresponding to the request to the data output apparatus 20.

The authentication processing unit 121 requests the user using the client PC 10a to input user information for login. The authentication processing unit 121 generates authentication information based on the user information input by the user, transmits the generated authentication information to the authentication server 31, and requests the authentication server 31 to perform authentication based on the authentication information. The authentication processing unit 121 receives the authentication result transmitted from the authentication server 31 in response to this request. Upon receiving the authentication result indicating successful authentication from the authentication server 31, the authentication processing unit 121 allows the user to log in to the client PC 10a.

Further, the authentication processing unit 121 may extract the user information used for generating the authentication information from the authentication information. The authentication processing unit 121 may extract the user information from the authentication information transmitted from the data output apparatus 20 and perform determination based on the extracted user information and the user information input by the user when the user log in the client PC 10a. The determination is described later.

The setting management unit 122 sets a folder to store a file of output data output from the data output apparatus 20 in a folder formed in, for example, the memory 1004 of the client PC 10a, and manages information of the set folder. The setting management unit 122 manages information of the set folder in association with user information.

As described in detail later, the setting management unit 122 causes the UI unit 100 to display a setting screen for setting the folder on the display 1007, and sets the folder according to the user operation on this setting screen. Instead of the folder in the memory 1004, the setting management unit 122 may set the folder to store the file of output data in a folder of, for example, a memory in a file server on the network 2 which the client PC 10a can access.

The folder management unit 123 manages the information of the folder set by the setting management unit 122. In response to a folder browsing request from the data output apparatus 20, which is described later, the folder management unit 123 acquires setting values of the folder (ex. path information and the like) from the setting management unit 122, checks, for example, a folder configuration on the client PC 10a, and returns folder information for browsing to the data output apparatus 20.

The file storage unit 124 stores the file storing the output data transmitted from the data output apparatus 20 in the folder managed by the folder management unit 123.

The information processing program to implement each function of the client PC 10a according to the embodiment may be stored in a computer-readable recording medium such as a compact disk (CD), a flexible disk (FD), and a digital versatile disc (DVD), in a file format installable or executable. Alternatively, the information processing program may be stored in a computer connected to a network such as the internet and provided by downloading via the network. The information processing program may be provided or distributed via the network such as the internet.

The information processing program has a module configuration including the UI unit 100, the communication unit 101, the information registration processing unit 110, the request receiving unit 120, the authentication processing unit 121, the setting management unit 122, the folder management unit 123, and the file storage unit 124. As an actual hardware configuration, the CPU 1000 reads and executes the information processing program from a recording medium such as the memory 1004, each of components described above is loaded to a main memory such as the RAM 1002, and the UI unit 100, the communication unit 101, the information registration processing unit 110, the request receiving unit 120, the authentication processing unit 121, the setting management unit 122, the folder management unit 123, and the file storage unit 124 are generated in the main memory.

Figure 6:
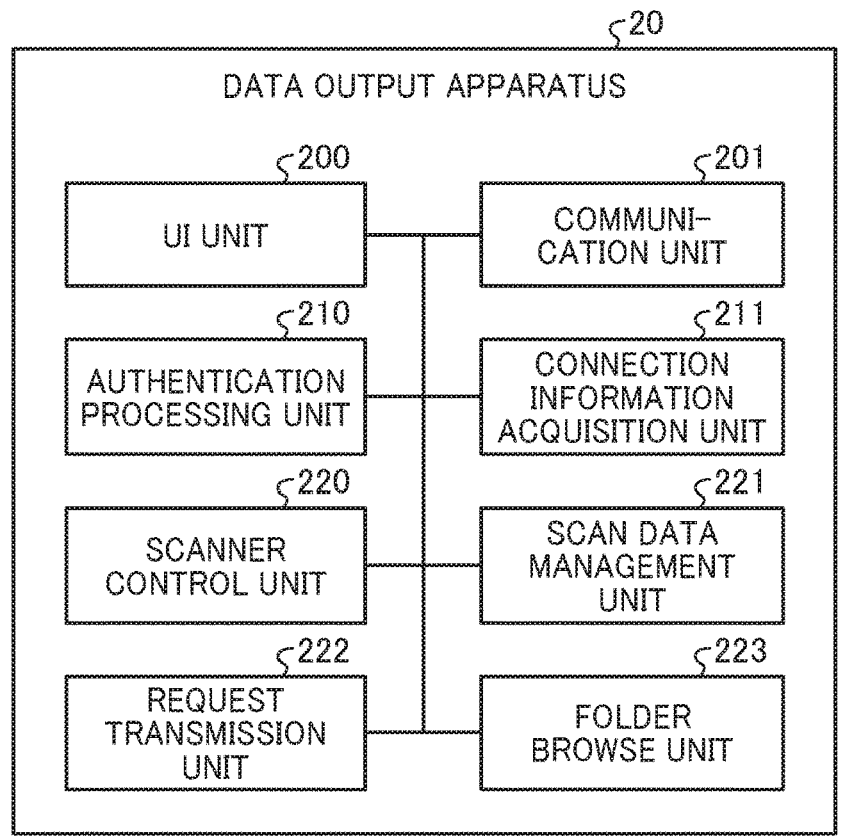
FIG. 6 is a functional block diagram illustrating functions of the MFP as the data output apparatus according to the embodiment.

FIG. 6 is a functional block diagram illustrating functions of the MFP as the data output apparatus according to the embodiment. In FIG. 6, the data output apparatus 20 includes a UI unit 200, a communication unit 201, an authentication processing unit 210, a connection information acquisition unit 211, a scanner control unit 220, a scan data management unit 221, a request transmission unit 222, and a folder browse unit 223.

The UI unit 200, the communication unit 201, the authentication processing unit 210, the connection information acquisition unit 211, the scanner control unit 220, the scan data management unit 221, the request transmission unit 222, and the folder browse unit 223 are implemented by a control program for the data output apparatus according to the embodiment executed by the CPU 2100. Alternatively, some or all of the UI unit 200, the communication unit 201, the authentication processing unit 210, the connection information acquisition unit 211, the scanner control unit 220, the scan data management unit 221, the request transmission unit 222, and the folder browse unit 223 may be configured as hardware to operate in conjunction with each other.

In FIG. 6, the UI unit 200 causes the OP 22 to display a menu and an information display screen. In addition, the UI unit 200 accepts user operations such as data input and operation instructions according to the menu. The communication unit 201 controls the communication I/F 2105 to communicate with the network 2.

The authentication processing unit 210 requests the user using the data output apparatus 20 to input the user information for login. The authentication processing unit 210 requests the authentication server 31 to perform the authentication processing based on the user information input by the user and receives the authentication result transmitted from the authentication server 31 in response to the request. Upon receiving the authentication result indicating successful authentication from the authentication server 31, the authentication processing unit 210 allows the user to log in to the data output apparatus 20.

When the request transmission unit 222, which is described later, transmits the request to the client PC 10a, the authentication processing unit 210 adds the authentication information generated based on the user information to this request.

The connection information acquisition unit 211 acquires connection information for communicating with the client PC 10a from the management server 30 based on the user information input by the user. The scanner control unit 220 controls the scanner 2131 according to the instruction to acquire the scan data read from the original document. The scan data management unit 221 manages the scan data acquired by the scanner control unit 220 and generates output data to transmit to the client PC 10a based on the scan data.

The request transmission unit 222 transmits a request such as folder browsing or data transmission to the client PC 10a.

The folder browse unit 223 generates a folder browse screen to browse the folder based on the folder information transmitted from the client PC 10a in response to the folder browse request transmitted to the client PC 10a by the request transmission unit 222. The folder browse screen is displayed on the OP 22 by the UI unit 200. The folder browse unit 223 designates the folder for storing the file of the output data according to the user operation based on the folder browse screen.

The control program for the data output apparatus to implement each function of the data output apparatus 20 according to the embodiment may be stored in a computer-readable recording medium such as the CD, the flexible disk, and a DVD, in a file format installable or executable for distribution. Alternatively, the control program for the data output apparatus may be stored in a computer connected to a network such as the internet and provided by downloading via the network. The control program for the data output apparatus may be provided or distributed via the network such as the internet.

The control program for the data output apparatus has a module configuration including the UI unit 200, the communication unit 201, the authentication processing unit 210, the connection information acquisition unit 211, the scanner control unit 220, the scan data management unit 221, the request transmission unit 222, and the folder browse unit 223. As an actual hardware configuration, the CPU 2100 reads and executes the control program for the data output apparatus from a recording medium such as the memory 2120, to load each of components described above to a main memory such as the RAM 2102. Accordingly, the UI unit 200, the communication unit 201, the authentication processing unit 210, connection information acquisition unit 211, the scanner control unit 220, scan data management unit 221, a request transmission unit 222 and a folder browse unit 223 are mounted on the main memory.

The control program for the data output apparatus can be provided as a plug-in program for adding the function described in the embodiment to the basic function of the data output apparatus 20 as the MFP.

Figure 7:
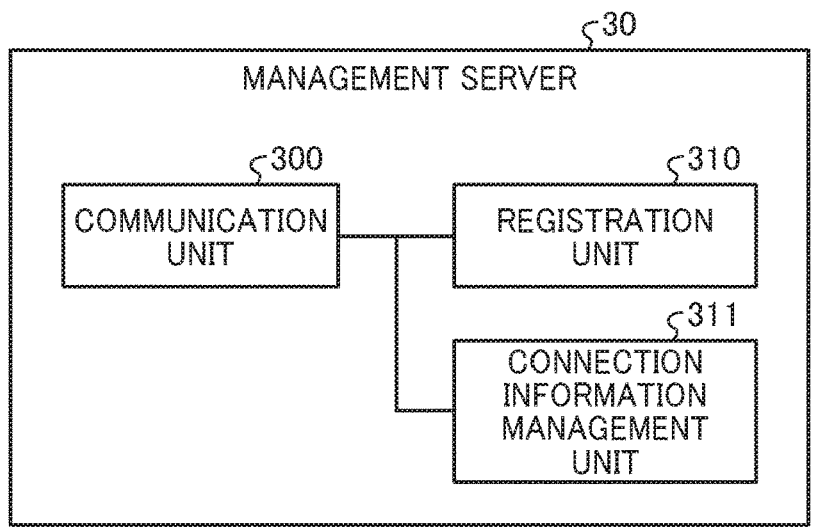
FIG. 7 is a functional block diagram illustrating functions of the management server according to the embodiment.

FIG. 7 is a functional block diagram illustrating functions of the management server 30 according to the embodiment. In FIG. 7, the management server 30 includes a communication unit 300, a registration unit 310, and a connection information management unit 311. The communication unit 300, a registration unit 310, and a connection information management unit 311 are implemented by a management program executed by the CPU 3000, according to the embodiment. Alternatively, some or all of the communication unit 300, a registration unit 310, and a connection information management unit 311 may be configured as hardware circuits that operate in conjunction with each other.

In FIG. 7, the communication unit 300 controls the communication I/F 3004 to communicate with the network 2. The registration unit 310 stores the user information and the connection information transmitted from the client PC 10a in association with each other, for example, in the memory 3003, and registers the user information and the connection information. In response to a request from the data output apparatus 20, the connection information management unit 311 transmits the connection information registered by the registration unit 310 to the data output apparatus 20.

Processing

Next, a detailed description of the processing according to the embodiment is given below.

Figure 8A:
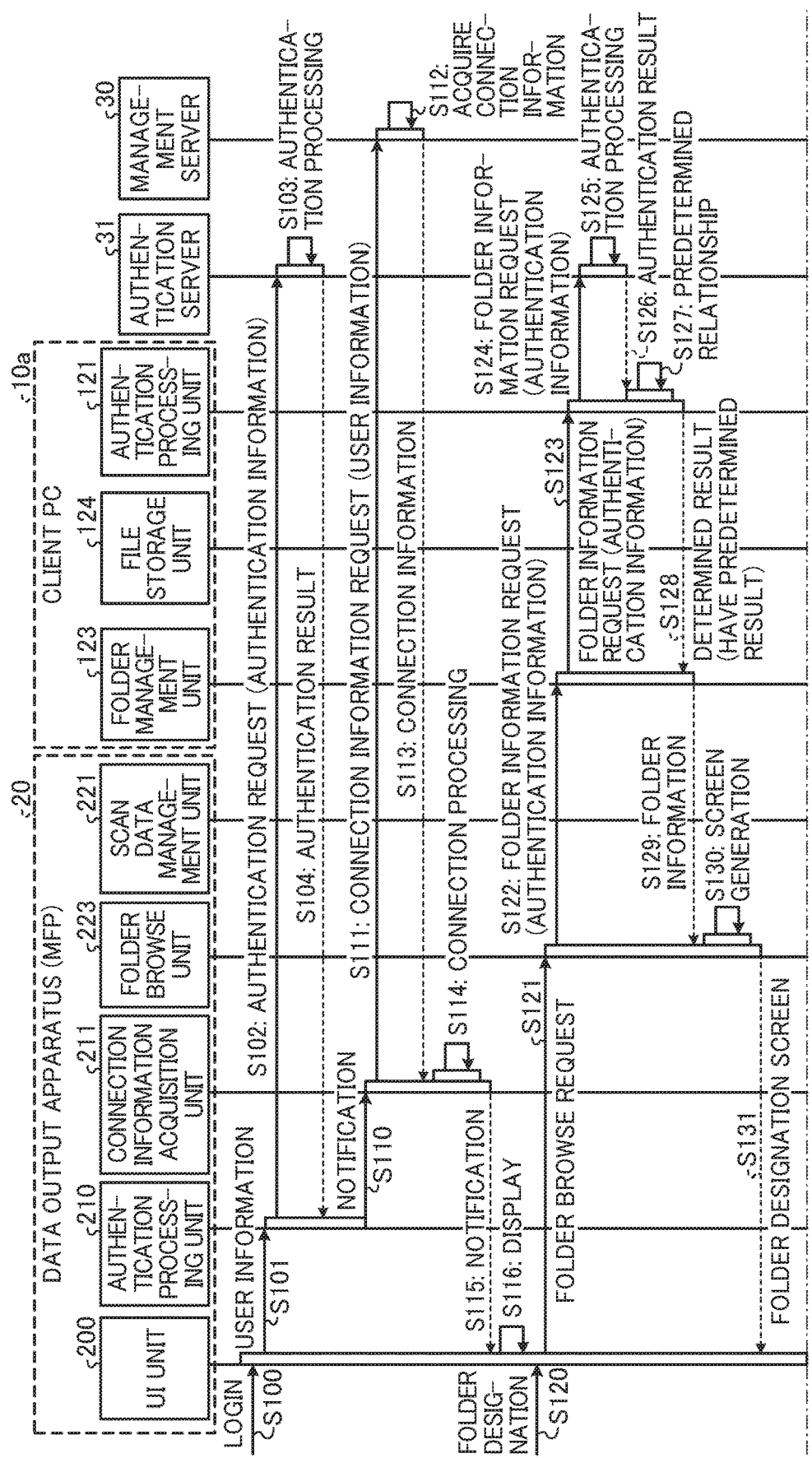
FIGS. 8A and 8B (collectively referred to as FIG. 8) are a sequence diagram illustrating an example of a file saving process according to the embodiment.
Figure 8B:
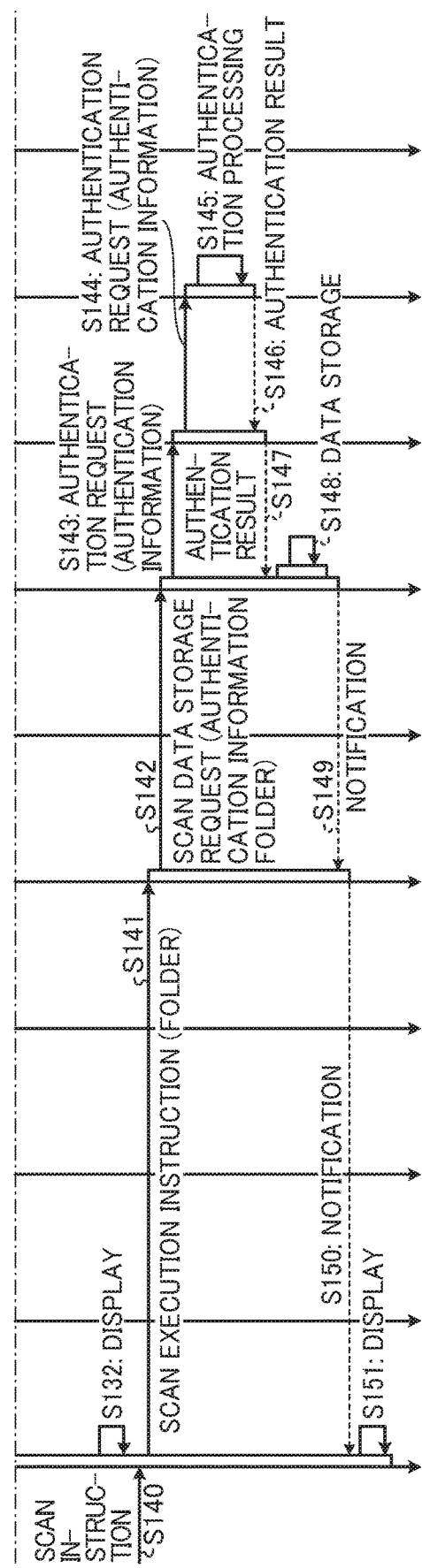

FIG. 8 is a sequence diagram illustrating an example of file saving process executed by the information processing system 1 according to the embodiment. In FIG. 8, the same reference numerals denote parts common to those in FIGS. 1, 5, and 6, and a detailed description thereof is omitted.

It is assumed that the user activates the client PC 10a and stores the output data file output from the data output apparatus 20 in a predetermined folder of, for example, the memory 1004 of the client PC 10a.

Prior to processing of the sequence diagram of FIG. 8, the management server 30 executes registration processing of the connection information of the client PC 10a associated with the user information so that the data output apparatus 20 connects and transmits to the client PC 10a via the network 2.

First, the user activates the client PC 10a in which one or more folders set in advance, as a storage area in which files of output data, that is scan data, output from the data output apparatus 20 are stored. A method of setting the folder in the client PC 10a is described later.

When the client PC 10a is activated, the authentication processing unit 121 as a second authentication processing unit controls the UI unit 100 to display to the user a screen to input user information for login that is second user information. The authentication processing unit 121 generates authentication information as second authentication information based on the user information input via the screen. The authentication processing unit 121 stores the generated second authentication information in, for example, the RAM 1002, and transmits the generated second authentication information to the authentication server 31 to request authentication processing. In response to reception of the authentication result indicating successful authentication from the authentication server 31, the authentication processing unit 121 allows the user to log in to the client PC 10a.

When the login of the user is allowed, the client PC 10a acquires the connection information from, for example, the communication unit 101, transmits the acquired connection information and the second user information to the management server 30, and requests registration of the connection information to the management server 30. The management server 30 associates the connection information transmitted from the client PC 10a with the second user information by the registration unit 310, stores the connection information in the memory 3003, and registers the connection information of the client PC 10a.

Processing of the sequence diagram of FIG. 8 is described. When the user activates the client PC 10a and logs in, the user instructs the data output apparatus 20 to execute data output processing. The user operates the OP 22 of the data output apparatus 20 to request login to the data output apparatus 20 (step S100). The UI unit 200 receives the request by the operation of the OP 22 and transmits the request to the authentication processing unit 210. In response to this request, the authentication processing unit 210 causes the UI unit 200 to control the OP 22 to display the user information input screen for inputting the user information. As the user information, for example, a combination of a user name and a password can be used.

It is assumed that the user inputs the same user information to the data output apparatus 20 and the client PC 10*a* including the folder storing the output data of the data output apparatus 20.

In the data output apparatus 20, the authentication processing unit 210 as a first authentication processing unit generates authentication information as first authentication information based on the user information as first user information input via the user information input screen, transmits the generated first authentication information to the authentication server 31, and requests authentication processing (steps S101 and S102). The authentication server 31 receives the first authentication information and an authentication request transmitted from the data output apparatus 20 and executes authentication processing based on the first authentication information in response to the received authentication request (step S103). The authentication server 31 returns the authentication result to the authentication processing unit 210 (step S104). It is assumed that the authentication server 31 returns an authentication result indicating successful authentication to the authentication processing unit 210.

When the authentication server 31 returns the authentication result indicating successful authentication, the authentication processing unit 210 notifies the connection information acquisition unit 211 (step S110) of the successful authentication. The connection information acquisition unit 211 adds the first user information to the connection information request requesting connection information and transmits the connection information request added the first user information to the management server 30 (step S111). In response to the connection information request, the management server 30 acquires the connection information associated with the user information that matches the first user information added to the connection information request from the registered connection information (step S112). The management server 30 transmits acquired connection information to the data output apparatus 20 (step S113). The data output apparatus 20 executes connection processing to establish a connection with the client PC 10*a* using the connection information transmitted from the management server 30 by the connection information acquisition unit 211 (step S114).

Upon completion of the connection processing, the connection information acquisition unit 211 notifies the UI unit 200 of the completion of the connection processing (step S115). Receiving this notification, the UI unit 200 causes the OP 22 to display a screen displaying completion of connection processing with the client PC 10*a* (step S116).

Next, the user designates the folder for storing the file of output data output from the data output apparatus 20 using the OP 22 (step S120). In response to this operation, the UI unit 200 requests the folder browse unit 223 to browse the folder (step S121). In response to this request, the folder browse unit 223 as a request unit transmits a request for the folder information for folder browsing to the folder management unit 123 of the client PC 10*a* (step S122). At this time, the folder browse unit 223 adds the first authentication information generated based on the first user information in step S101 and step S102 to the folder information request, and transmits the first authentication information to the folder management unit 123.

Upon receiving the request for the folder information, the folder management unit 123 transmits the first authentication information to be added to the authentication processing unit 121 and requests the authentication processing based on the first authentication information (step S123). The authentication processing unit 121 transmits an authentication processing request including the first authentication information to the authentication server 31, and requests the authentication server 31 to perform the authentication processing based on the first authentication information (step S124). The authentication processing unit 121 stores the first authentication information, for example, in the RAM 1002.

In response to the authentication processing request, the authentication server 31 executes the authentication processing based on the first authentication information (step S125), and returns the authentication result to the authentication processing unit 121 (step S126). It is assumed that the authentication server 31 returns an authentication result indicating successful authentication.

Upon receiving the authentication result indicating the success of the authentication from the authentication server 31, the authentication processing unit 121 determines whether the first authentication information that results in the success of the authentication and the second authentication information based on the user information input by the user when the user logs in to the client PC 10*a* have a predetermined relationship (step S127).

For example, the authentication processing unit 121 extracts the first user information from the first authentication information, compares the taken first user information with the second user information, and determines whether the first user information coincides with the second user information. In this case, the predetermined relationship between the first authentication information and the second authentication information becomes a relationship in which the first user information corresponding to the first authentication information coincides with the second user information corresponding to the second authentication information.

When the user inputs the same user information respectively to the client PC 10*a* and the data output apparatus 20, the determination in step S127 is considered as processing that determines whether the user who inputs the first user information and the user who inputs the second user information are the same user.

When the authentication processing unit 121 determines that the first authentication information and the second authentication information have a predetermined relationship, the authentication processing unit 121 returns a determination result indicating that the first authentication information and the second authentication information have the predetermined relationship to the folder management unit 123 (step S128). In accordance with the determination result, the folder management unit 123 transmits a folder information list indicating the folder predetermined for storing the file of output data from the data output apparatus 20 (step S129). The folder management unit 123 transmits this folder information list to the folder browse unit 223 in the data output apparatus 20.

In this manner, the authentication processing unit 121 and the folder management unit 123 works as a transmission unit that transmits information indicating the folder for storing the file of the output data from the data output apparatus 20 to the data output apparatus 20.

Based on the folder information list transmitted from the client PC 10a, the folder browse unit 223 generates a folder designation screen to allow the user to browse the folder indicated in the folder information list (Step S130). Designation of the folder and execution of scanning are received on the folder designation screen. The UI unit 200 displays the folder designation screen on the OP 22 (steps S131 and S132).

The user operates the folder designation screen displayed on the OP 22 and instructs the data output apparatus 20 to perform scanning on the original document to be scanned that is set in the scanner 2131 in step S140. In instructing execution of scanning, the user operates the folder designation screen displayed on the OP 22 and designates a folder to be a storage location of scan data generated by scanning. Upon receiving this operation, the UI unit 200 transmits a scan execution instruction including information of the specified folder to the scan data management unit 221 in accordance with the received operation (step S141).

For example, the scan data management unit 221 transmits the scan execution instruction to the scanner control unit 220. The scanner control unit 220 controls the scanner 2131 to execute scanning with respect to the set original document. The scanner executes scanning, the scanner 2131 outputs scan data, and the scanner control unit 220 transmits the scan data based on the original document to the scan data management unit 221.

The scan data management unit 221 transmits a scan data storage request to request the client PC 10a to save the scan data (step S142). The scan data storage request includes the scan data transmitted form the scanner 2131 as the output data of the data output apparatus 20, the first authentication information authenticated in the processing of the above-described steps S102 to S104, and the folder information of the folder designated to be the storage location of scan data.

The client PC 10a receives the scan data storage request, that is, the file storage unit 124 in the client PC 10a receives the scan data storage request. The file storage unit 124 requests the authentication processing unit 121 to perform authentication based on the first authentication information included in the scan data storage request and transmits an authentication processing request including this first authentication information to the authentication processing unit 121 (Step S143). The authentication processing unit 121 transmits the authentication processing request to the authentication server 31 (step S144).

In response to the authentication processing request, the authentication server 31 executes authentication processing based on the first authentication information (step S145) and transmits the authentication result to the client PC 10a (step S146). It is assumed that the authentication server 31 transmits an authentication result indicating successful authentication to the client PC 10a. This authentication result is received by the client PC 10a, passed to the authentication processing unit 121, and passed from the authentication processing unit 121 to the file storage unit 124 (step S147).

Upon receiving the authentication success result from the authentication processing unit 121, the file storage unit 124 stores the scan data as the output data from the data output apparatus 20 included in the scan data storage request received in the above-described step S142 in a file and saves it in the folder specified by the folder information (step S148). At this time, the file storage unit 124 sets a file name of the file in which the scan data is stored according to a predetermined rule. For example, the file storage unit 124 may set the file name based on information indicating the current date and time.

Alternatively, for example, the user may set the file name to a desired name by operating the OP 22 when a scan instruction is issued in step S140.

Upon completion of the storage of the file storing the scan data, the file storage unit 124 transmits, for example, a notice of the completion to the data output apparatus 20 (step S149). The file storage unit 124 may include information indicating the file name of the file storing the scan data in this notification.

The scan data management unit 221 in the data output apparatus 20 receives the notice indicating completion of file saving and transmits the notice to the UI unit 200 (step S150). The UI unit 200 causes the OP 22 to display a screen based on the notice (step S151). This screen may include, for example, information indicating the completion of scanning, the file name and the storage location (path information) of the file storing the scan data.

As described above, in the present embodiment, when the data output apparatus 20 requests the client PC 10a for the folder information for storing the output data under the user's instruction, the data output apparatus 20 transmits the first authentication information that is used for the user authentication in the data output apparatus 20 to the client PC 10a. The client PC 10a determines whether the user who uses the data output apparatus 20 and the user who uses the client PC 10a are the same user based on the first authentication information and the second authentication information that is used for the user authentication in the client PC 10a. When both are regarded as the same user, the folder information is presented to the data output apparatus 20.

Therefore, with the folder on the client PC 10a secured, it is possible to directly save the output data of the data output apparatus 20 from the data output apparatus 20 to the folder on the client PC 10a.

Details of Folder Setting Process According to Embodiment

As described above, in the embodiment, prior to the process according to the sequence diagram of FIG. 8, one or more folders capable of storing files of output data (scan data) output from the data output apparatus 20 are previously set in the client PC 10a. Hereinafter, a folder setting method according to the embodiment is described.

Figure 9A:
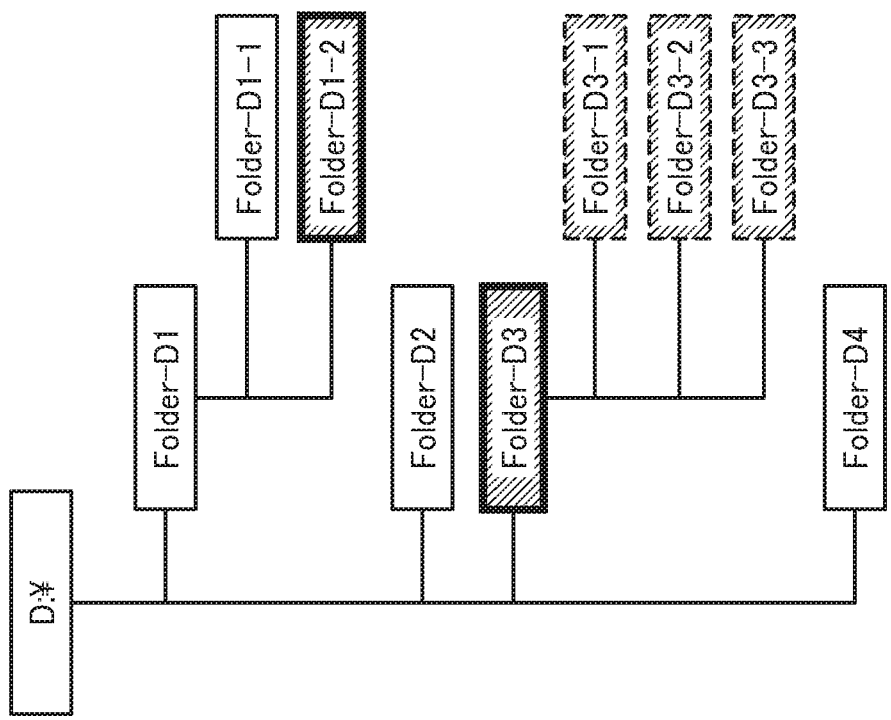
FIGS. 9A and 9B (collectively referred to as FIG. 9) are diagrams each illustrating a folder configuration of the client PC according to the embodiment.
Figure 9B:
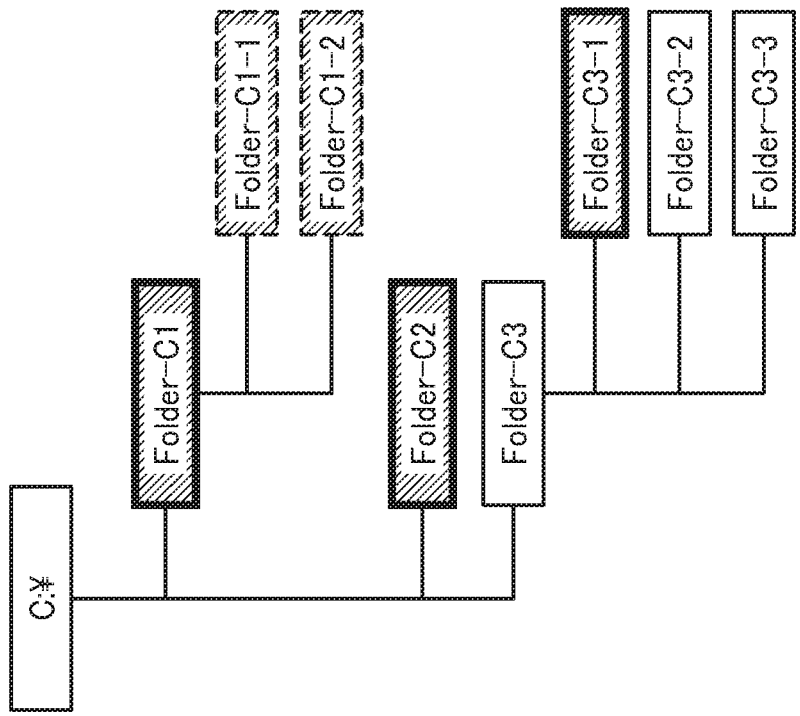

FIG. 9 is a diagram illustrating a folder configuration of the client PC 10a according to the embodiment. It is assumed that the client PC 10a includes two drives (that is, two storage areas) "C" and "D" of, for example, physically different areas on the memory 1004 or drives by different storages 1004. The drive "C" has three folders "Folder-C1", "Folder-C2", and "Folder-C3" in a layer immediately under the drive "C".

Additionally, in the example of FIG. 9, the "Folder-C1" has two folders "Folder-C1-1" and "Folder-C1-2" in a layer immediately under the folder "Folder-C1", and the folder "Folder-C3" has three folders "Folder-C3-1", "Folder-C3-2", and "Folder-C3-3" in a layer immediately under the "Folder-C3". In this way, the folder provided in the layer immediately under the folder is called the sub-folder for the folder in the immediately higher layer.

Similarly, in the drive "D", the drive "D" has four folders "Folder-D1", "Folder-D2", "Folder-D3", and "Folder-D4" in a layer immediately under the drive "D". Additionally, the "Folder-D1" has two folders "Folder-D1-1" and "Folder-D1-2" in a layer immediately under the folder "Folder-D1", and the folder "Folder-D3" has three folders "Folder-D3-1", "Folder-D3-2", and "Folder-D3-3" in a layer immediately under the "Folder-D3".

In the example of FIG. 9, the folder "Folder-C2" in the layer immediately under the drive "C" and the folders "Folder-D2" and "Folder-D4" in the layer immediately under the drive "D" do not have the sub-folder.

In the example of FIG. 9, in such a folder structure, for example, the folder in which the file is stored becomes the folders "Folder-C1", "Folder-C2", and "Folder-C3-1" of the drive "C" and the folders "Folder-D1-2" and "Folder-D3" of the drive "D" as drawn by hatching the thick frame in FIG. 9. These folders "Folder-C1", "Folder-C2", "Folder-C3-1", "Folder-D1-2", and "Folder-D3" are designated in response to an operation on the OP 22 by the user. Designated folders "Folder-C1", "Folder-C2", "Folder-C3-1", "Folder-D1-2" and "Folder-D3" are called root folders. The root folder can refer to the folder in its lower layer, that is, the sub-folder, but cannot refer to the folder in its higher layer, that is, the parent folder. Or the root folder does not have the parent folder.

When the root folder has the sub-folder, the sub-folder can also be designated as the folder where the file is saved. In the example of FIG. 9, folders as indicated by oblique lines in the dotted frame can be further used as the folder where the file is stored. Those are the folders "Folder-C1-" and "Folder-C1-2" which are sub-folders of the designated folder "Folder-C1", and the folders "Folder-D3-1", "Folder-D3-2", and "Folder-D3-3" which are sub-folders of the designated folder "Folder-D3".

Thus, in the embodiment, it is possible to designate a plurality of folders as storage destinations of output data output from the data output apparatus 20. Also, the plurality of folders can include folders on different drives.

Figure 10A:
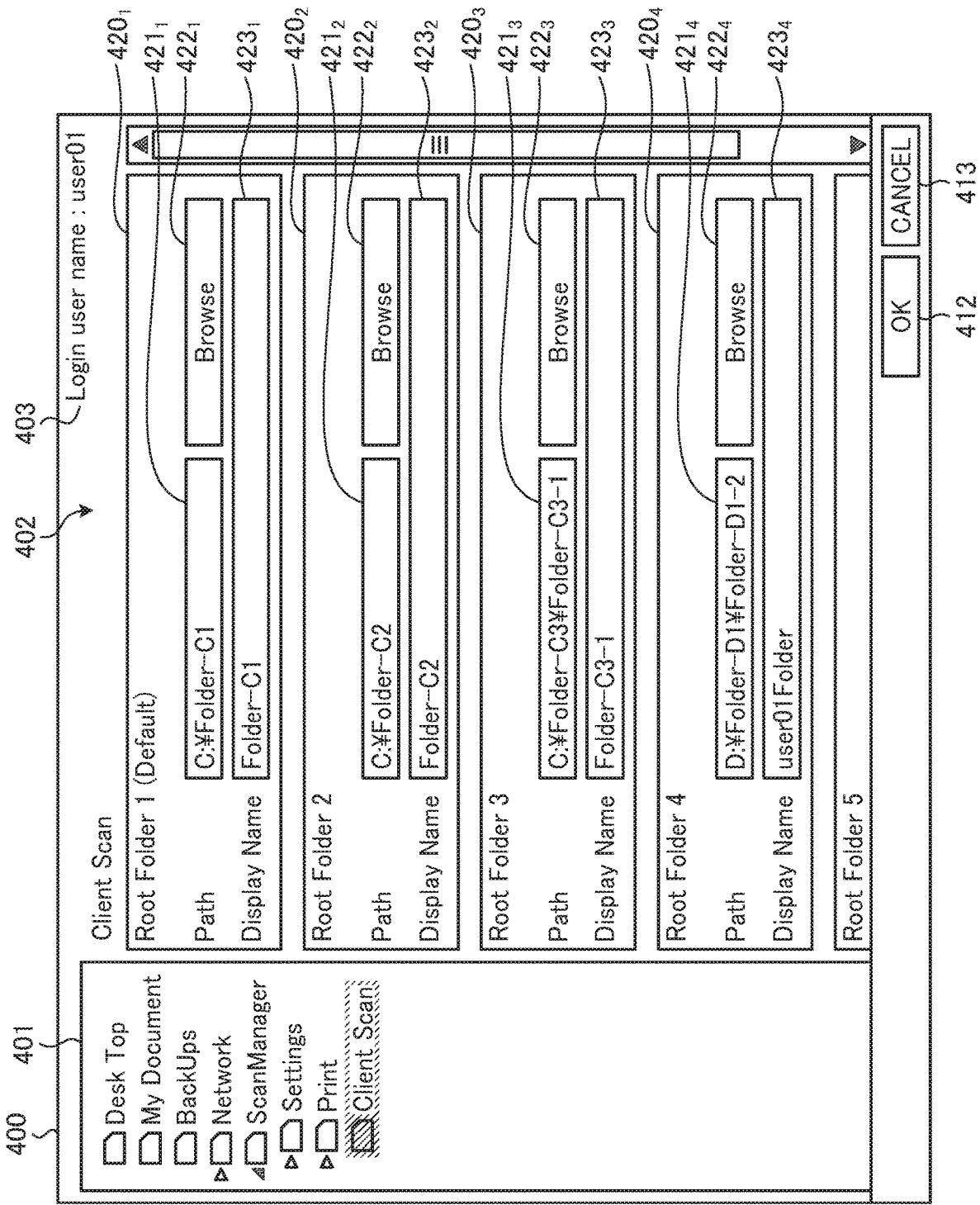
FIG. 10A is a diagram illustrating an example of a setting screen for setting a folder as a storage destination of data from the data output apparatus according to the embodiment.

FIG. 10A illustrates an example of a setting screen according to the embodiment on the client PC 10a. The setting screen includes a setting area for setting the folder as the storage destination of data from the data output apparatus 20. In FIG. 10A, the setting screen 400 includes a navigation area 401 and a folder designation area 402. The setting screen 400 of FIG. 10A is displayed by the UI unit 100, for example.

In the example of FIG. 10A, the setting screen 400 further includes a login user name display area 403. The login user name display area 403 displays the user name of the user who logs into the client PC 10a and makes the setting screen 400 visible at that time.

Further, in FIG. 10A, buttons 412 and 413 are provided at the lower part of the setting screen 400. The button 412 is a button to confirm each value entered in the folder designation area 402 of the setting screen 400 and pass the value to the setting management unit 122. The button 413 is a button to cancel the input contents of the folder designation area 402 and close the setting screen 400 according to the operation.

The navigation area 401, for example, displays a list of the respective functions in the client PC 10a that can be set with the authority of the user logged in the client PC 10a. In the example of FIG. 10A, a function "Client Scan" is a function to set the storage destination of the output data from the data output apparatus 20. In this example, as indicated by hatching in FIG. 10A, the function "Client Scan" is designated in the navigation area 401.

The folder designation area 402 is an area to designate the root folder that stores the output data from the data output apparatus 20. Specifically, when the function "Client Scan" is designated in the navigation area 401, a root folder designation area to designate the root folder is displayed in the folder designation area 402 based on information controlled and associated with the user information of the user name displayed on the login user name display area 403 among the folder information controlled by the setting management unit 122.

In the example of FIG. 10A, each of root folder designation areas $420_1$, $420_2$, $420_3$, $420_4$, . . . is displayed in the folder designation area 402. Each of the root folder designation areas $420_1$, $420_2$, $420_3$, $420_4$, . . . includes path display units $421_1$, $421_2$, $421_3$, $421_4$, . . . , browse buttons $422_1$, $422_2$, $422_3$, $422_4$, . . . , and display name input areas $423_1$, $423_2$, $423_3$, $423_4$, . . . , respectively.

The root folder designation area $420_1$ is described as an example. The browse button $422_1$ is a button to select the folder. For example, the UI unit 100 requests a list of folders accessible on the client PC 10a to an operating system (OS) of the client PC 10a in response to the operation on the browse button $422_1$, and in response to this request, the UI unit 100 displays a folder list screen based on the folder list obtained from the OS. The folder list screen may be displayed using a standard screen provided by the OS. The folder list acquired in the embodiment is a list of folders accessible with an authority of the user who logs into the client PC 10a and makes the setting screen 400 visible at that time.

The path display unit $421_1$ displays a path of the folder designated by the user operation according to the folder list screen displayed by the operation on the browse button $422_1$ (in this example, the path "C: ¥ Folder-C1").

The display name input area $423_1$ is an area to input a display name when the path (that is, the folder) displayed on the path display unit $421_1$ is displayed on the folder list screen in the OP 22 of the data output apparatus 20.

A default display name in the display name input area $423_1$ is a name of the folder in the lowest layer in the path displayed in the path display unit $421_1$, which is input in advance. In the example of FIG. 10A, the path "C: ¥ Folder-C1" is displayed in the path display unit $421_1$, and the display name "Folder-C1" is input to the display name input area $423_1$. When another display name is input to the display name input area $423_1$ according to the user's operation, the display name displayed in the display name input area $423_1$ is updated with the newly input name.

In the example of FIG. 10A, in the root folder designation area $420_4$, a display name "user 01 Folder" different from the lowest folder name "Folder-D1-2" in the path displayed in the path display unit $421_4$ is input in the display name input area $423_4$.

When none of the folder information is managed in the setting management unit 122, the folder designation area 402 displays one root folder designation area $420_1$ in a default state in which, for example, the path display unit $421_1$ and the display name input area $423_1$ are blank.

The setting management unit 122 stores each folder information designated as the root folder in the folder designation area 402 of the setting screen 400 as a folder information table. The setting management unit 122 stores the folder information table in a predetermined area of the memory 1004. Table 1 is an example of the folder information table applicable to the embodiment.

TABLE 1

| Folder Path | Display Name |
| --- | --- |
| C: ¥ Folder-C1 | |
| C: ¥ Folder-C2 | |

TABLE 1-continued

| Folder Path | Display Name |
|---|---|
| C: ¥ Folder-C3 ¥ Folder-C3-1 | |
| D: ¥ Folder-D1 ¥ Folder-D1-2 | user01Folder |
| D: ¥ Folder-D3 | user01ScanImage |

In Table 1, the folder information table includes items of "folder path" and "display name". The item "folder path" stores path information of the folder. The item "display name" stores the display name set in the folder in the lowest layer of the path information stored in the corresponding item "folder path". When the item "display name" is blank, the lowest layer folder name in the path information of the folder stored in the corresponding item "folder path" is used as the display name.

The example of Table 1 corresponds to the example of FIG. 10A. The item "folder path" stores the three pieces of path information "C: ¥ Folder-C1", "C: ¥ Folder-C2" and "C: ¥ Folder-C3 ¥ Folder-C3-1", and the item "display name" corresponding to each of the three pieces of path information is blank. Therefore, as the display name, the name of the folder in the lowest layer of each path information "Folder-C1", "Folder-C2", and "Folder-C3-1" is used. On the other hand, in the path information "D: ¥ Folder-D1 ¥ Folder-D1-2" and "D: ¥ Folder-D3" stored in the item "folder path", "user 01 Folder" and "user 01 ScanImage" stored in the item "display name" are used as display names.

The setting management unit 122 stores and manages this folder information table in association with user information. That is, the setting management unit 122 stores and manages the folder information table for each user.

In step S129 of FIG. 8 described above, the folder management unit 123 requests the setting management unit 122 for the folder information table associated with the first user information, which is input in step S100 by the user and authenticated. The folder management unit 123 transmits to the data output apparatus 20 a list of folder information including path information and display names stored in the folder information table obtained in response to the request as a folder information list.

In step S132 of FIG. 8, the user designates the folder on the folder designation screen displayed on the OP 22 of the data output apparatus 20 to store the file of the output data from the data output apparatus 20 in the folder. At this time, the name of the folder in the lowest layer of the path information is displayed on the folder designation screen for the folder for which the display name is not set.

On the other hand, in a plurality of root folders, folders in the lowest layer may have the same folder name. For example, a folder of the path "C: ¥ Folder-C1 ¥ Folder001" and a folder of the path "D: ¥ Folder-D3 ¥ Folder001" may be designated as the root folder. When the folder designation screen of the OP 22 displays the same folder name "Folder 001" in the lowest layer of the two folders as the display names the identification of these two folders is not possible as the display name is the same.

Therefore, when a plurality of folders having the same folder name as the display name are specified as the root folders, in order to uniquely identify these root folders, the user inputs a display name that can uniquely identify the root folder in the display name input areas $423_1$, $423_2$, etc. corresponding to the root folders.

In the setting screen 400 of FIG. 10A, when the user operates the button 412, the setting management unit 122 receives the input contents of the folder designation area 402 and stores the folder information.

At this time, the UI unit 100 determines whether there is the same display name in the display name input areas $423_1$, $423_2$, . . . , for example, in response to the operation on the button 412. When the UI unit 100 determines that there is the same display name in the display name input areas, the UI unit 100, for example, displays an alarm notification on the setting screen 400 and invalidates the user operation on the button 412.

Figure 10B:
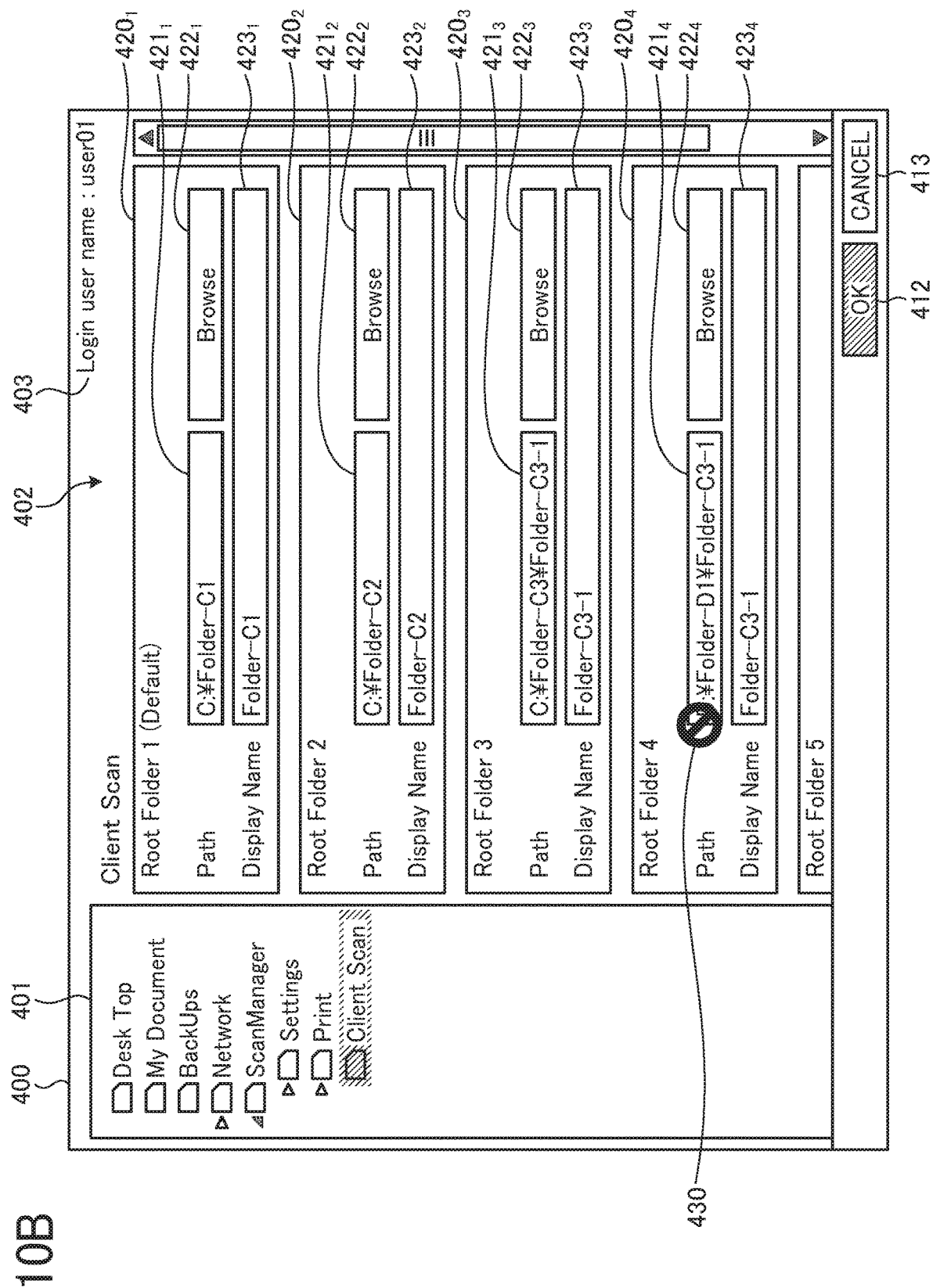
FIG. 10B is a diagram illustrating an example of a setting screen displaying an alarm notification, applicable to the embodiment.

FIG. 10B is a diagram illustrating an example of a setting screen 400 displaying an alarm notification, applicable to the embodiment. In the example of FIG. 10B, the path information "C: ¥ Folder-C3 ¥ Folder-C3-1" input to the path display unit $421_3$ and the path information "D: ¥ Folder-D1 ¥ Folder-C3-1" input to the path display unit $421_4$ include the folders having the same folder name "Folder-C3-1" in the lowest layer. As illustrated in the display name input areas $423_3$ and $423_4$ in FIG. 10B, the use of the display name in the above example causes the use of the same display name.

Therefore, the UI unit 100 displays an alarm notification 430 at a position corresponding to the same display name, for example, in the vicinity of the display name input area $423_4$. In addition, the UI unit 100 invalidates the operation performed on the button 412 with the button 412 grayed out, which is indicated by hatching in FIG. 10B, and does not execute the process of causing the setting management unit 122 to store the folder information. In this case, for example, inputting a different name in at least one of the display name input areas $423_3$ and $423_4$ that have the same display name makes the operation on the button 412 valid, and enables the setting management unit 122 to store the folder information.

Figure 11A:
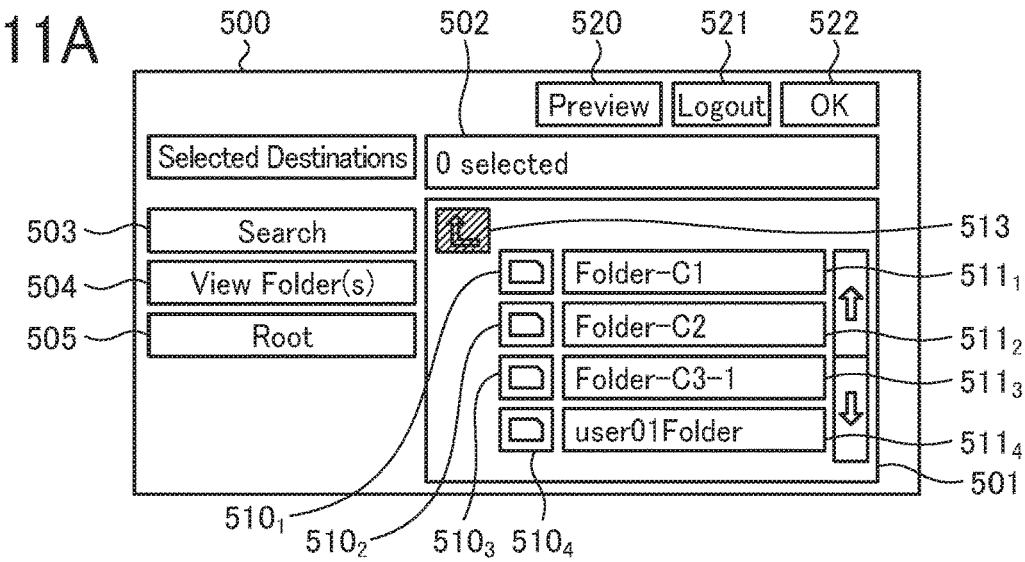
FIGS. 11A, 11B, and 11C are diagrams each illustrating an example of a folder selection screen according to the embodiment, which are displayed on an operation panel (OP) of the data output apparatus.
Figure 11B:
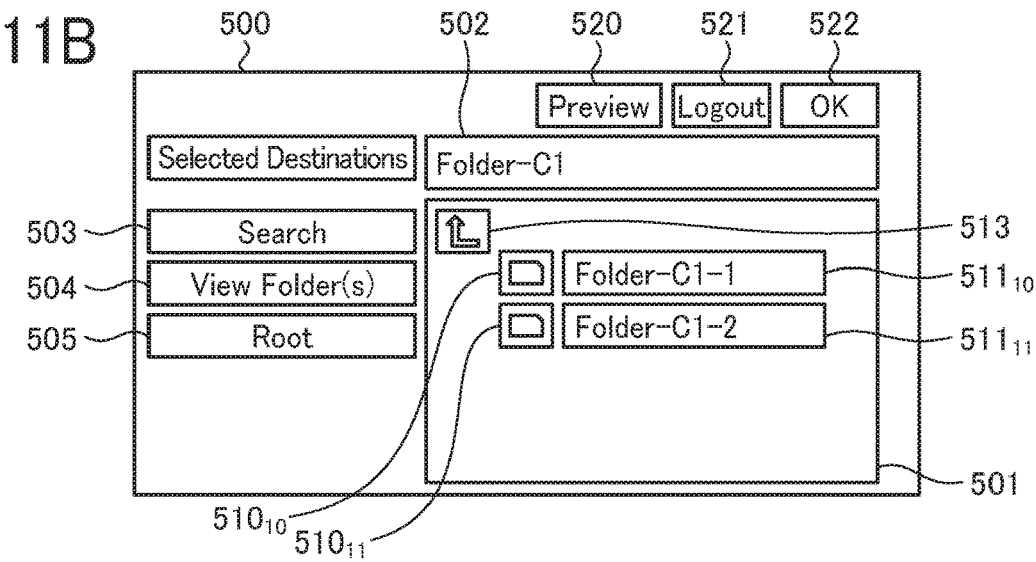
Figure 11C:
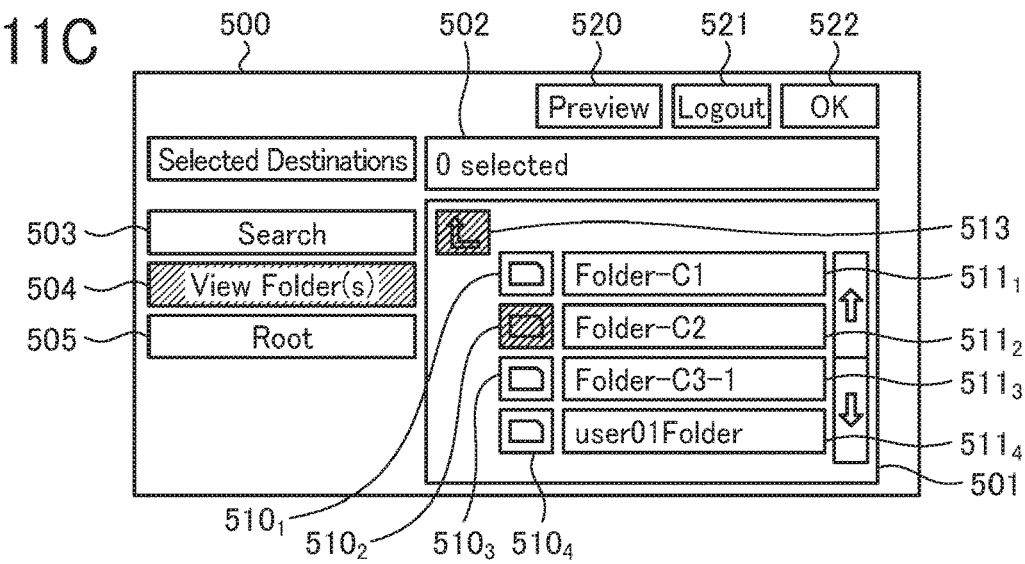

FIGS. 11A, 11B, and 11C are diagrams illustrating an example of a folder designation screen according to the embodiment, which is displayed on an operation panel (OP) 22 of the data output apparatus in step S140 of FIG. 8 described above. The user uses the setting screen 400 in FIG. 10A to set the folder designation screen. Based on the folder information list made of folder information stored in the folder information table of Table 1, the folder browse unit 223 generates the folder designation screen, and OP 22 displays the folder designation screen.

In FIG. 11A, the folder designation screen 500 includes a folder designation area 501, a selected storage destination display area 502, and buttons 503, 504, 505, 520, 521, and 522. The button 521 is a button to instruct logout from the data output apparatus 20.

The folder designation area 501 is an area to designate a folder that is a storage location of scan data generated by scanning. The buttons 520 and 522 are buttons for instructing the data output apparatus 20 to execute scanning in a preview mode and a normal mode, respectively. In the preview mode, for example, executing scanning, the data output apparatus 20 does not output scan data. In the normal mode, executing scanning, the data output apparatus 20 outputs scan data. The data output apparatus 20 transmits the scan data output by execution of the scanning in the normal mode as output data to the client PC 10a, and the client PC 10a stores the scan data in the folder designated in the folder designation area 501.

The button 503 is a button to search the folder based on, for example, the display name. The button 504 is a button to browse the sub-folder included in the specified folder. The button 505 is a button to return to the display of the root folder.

The folder designation area 501 includes folder designation buttons 511₁, 511₂, 511₃, 511₄, . . . based on each folder information included in the folder information list, sub-folder designation buttons 510₁, 510₂, 510₃, 510₄, . . . , a layer move button 513.

In a default state, the folder designation buttons 511₁, 511₂, . . . display the display names of the root folders each of which corresponds to each folder information included in the folder information list. For the folder information not including the display name in the folder information list, folder designation buttons 511₁, 511₂, . . . display the folder names of the lowest layer of the path information included in the folder information. For the folder information including the display name in the folder information list, the folder designation buttons 511₁, 511₂, . . . display the display names included in the folder information.

The example in FIGS. 11A, 11B, and 11C corresponds to the folder configuration illustrated in FIG. 9 and the folder information list of the Table 1 displays the folder designation buttons 511₁, 511₂, . . . .

The sub-folder designation buttons 510₁, 510₂, . . . are buttons to display the sub-folder of the folder corresponding to folder designation buttons 511₁, 511₂, . . . respectively. Designation of a desired sub-folder designation button among the sub-folder designation buttons 510₁, 510₂, . . . and operation of the button 504 leads to display information indicating the sub-folder of the folder corresponding to the designated sub-folder designation button, for example, in the folder designation area 501.

An example of processing when the sub-folder designation buttons 510₁, 510₂, . . . are operated is described. The example when the sub-folder designation button 510₁ is designated is described. The sub-folder designation button 510₁ corresponds to the folder designation button 511₁ of the display name "Folder-C1" for specifying the folder "C: ¥ Folder-C1" that is the root folder as illustrated in FIG. 9.

The folder browse unit 223 requests information on the sub-folder of the folder "C: ¥ Folder-C1" to the client PC 10a. In the client PC 10a, in response to this request, the folder management unit 123 returns "Folder-C1-" and "Folder-C1-2" that are folder names of the folders "C: ¥ Folder-C1 ¥ Folder-C1-1" and "C: ¥ Folder-C1 ¥ Folder-C1-2" that are sub-folders in the lowest layer under the folder "C: ¥ Folder-C1".

When the user operates the button 504 in the data output apparatus 20 under this situation, the folder browse unit 223 uses these folder names "Folder-C1-1" and "Folder-C1-2" as display names to generate the folder browse screen that displays each folder designation button corresponding to each folder and each sub-folder designation button in the folder designation area 501 as illustrated in FIG. 11B.

In the example of FIG. 11B, the folder browse unit 223 displays the folder designation button 511₁₀ using the folder name "Folder-C1-1" as the display name, the folder designation button 511₁₁ using the folder name "Folder-C1-2" as the display name, the sub-folder designation button 510₁₀ corresponding to the folder designation button 511₁₀, and the sub-folder designation button 510₁₁ corresponding to the folder designation button 511₁₁ in the folder designation area 501. Further, in this example, the folder browse unit 223 displays the folder name "Folder-C1" of the parent folder of each folder of folder names "Folder-C1-1" and "Folder-C1-2" in the selected storage destination display area 502.

As another example, the example when the sub-folder designation button 510₂ is designated is described. The sub-folder designation button 510₂ corresponds to the folder designation button 511₂ of the display name "Folder-C2" for specifying the folder "C: ¥ Folder-C2" that is the root folder as illustrated in FIG. 9.

As described above, the folder browse unit 223 requests information on the sub-folder of the folder "C: ¥ Folder-C2" to the client PC 10a. In the client PC 10a, in response to this request, the folder management unit 123 tries to acquire the information of the sub-folder of the folder "C: ¥ Folder-C2". In the example of FIG. 9, since the folder "C: ¥ Folder-C2" does not have the sub-folder, the folder management unit 123 returns this information to the data output apparatus 20.

Based on the information returned from the client PC 10a that the specified folder "C: ¥ Folder-C2" does not have the sub-folder, the folder browse unit 223 in the data output apparatus 20 grays out the sub-folder designation button 510₂ and the button 504 corresponding to the folder "C: ¥ Folder-C2", as illustrated by hatching in FIG. 11C, and invalidates the operation to browse the sub-folder of the folder "C: ¥ Folder-C2".

The layer move button 513 in the folder designation area 501 changes from a display of the folders corresponding to the folder designation buttons 511₁, 511₂, 511₃, and 511₄ to a display of the parent folders, that is, the folders one level higher in the folder designation area 501. In the example of FIG. 11A, since the folder corresponding to each of folder designation buttons 511₁, 511₂, 511₃, and 511₄ is the root folder, the folder browse unit 223 grays out the layer move button 513 as illustrated by hatching in FIG. 11A and invalidates the operation of the layer move button 513. This makes it impossible to change the display of the higher layer of the folder set as the root folder.

On the other hand, in the example of FIG. 11B, each folder corresponding to each of folder designation buttons 511₁₀ and 511₁₁ is the sub-folder of the folder "C: ¥ Folder-C1". Therefore, the operation of the layer move button 513 leads to a change to the display of the layer of the parent folder as illustrated in FIG. 11A.

In the embodiment, communication between the data output apparatus 20 and the client PC 10a as described above is performed using a protocol called Web-based Distributed Authoring and Versioning (WebDAV). The Web-DAV is a protocol for managing resources such as files in a distributed environment and uses resource names to identify resources. The WebDAV does not have the same resource name in an ordinary folder, and identifies the resource by the resource name.

When a plurality of folders in different places are arranged as a root folder under one route as in the embodiment, duplication of resource names may occur. Therefore, in the embodiment, setting the display name different from the folder name avoids the duplication of the resource names.

Another protocol capable of passing folder path information may be applied to the communication between the client PC 10a and the data output apparatus 20. In this case, setting of the display name for the folder may be omitted. However, when the client PC 10a pass the folder path to the data output apparatus 20, not to trace the parent folder of the root folder, the data output apparatus 20 or the client PC 10a may perform determination and control about browse.

In the embodiment, the client PC 10a transmits the name of the folder at the lowest layer of the folder path designated as the root folder or the display name set for the root folder to the data output apparatus 20. The data output apparatus 20 may set the sub-folder of the root folder that can be browsed by specifying (opening) the root folder as the storage destination of the output data. The data output apparatus 20 may also set a sub-folder of the above described sub-folder as the storage destination of the output data. On the other hand, the data output apparatus 20 can not specify and set the folder in the higher layer with respect to the root folder as the storage destination of the output data.

First Variation

The above embodiment is described assuming the first user information input when the user logs in the data output apparatus 20 is the same as the second information input when the user logs in the client PC 10a. On the other hand, the first variation of the embodiment is an example in which one user logs in to the data output apparatus 20 and the client PC 10a using different user information.

To avoid complication, the following description is given focusing on differences from the above-mentioned embodiment with reference to FIGS. 1 to 11. To make the following description simple, it is assumed that the user information is a single unique identification information for each user.

For example, it is assumed that the user A logs in to the data output apparatus 20 using the user information "AAA" as the first user information and to the client PC 10a using the user information "BBB" as the second information different from the user information "AAA". For example, in the client PC 10a, the authentication processing unit 121 stores association information in which the user information "AAA" of the user A is associated with the user information "BBB" in advance. The association information is inputted in advance, for example, in the client PC 10a and stored in the memory 1004.

Prior to the processing according to the sequence diagram of FIG. 8, the user A logs in to the client PC 10a using the user information "BBB" as in the above-described embodiment. The client PC 10a logged in by the user A registers connection information for the data output apparatus 20 to connect and communicate to the client PC 10a via the network 2 in the management server 30. At this time, the client PC 10a transmits the connection information to the management server 30 together with the user information "AAA" that is the user information used when the user A logs in to the data output apparatus 20.

The management server 30 associates the connection information transmitted from the client PC 10a with the user information "AAA", stores the connection information, for example, in the memory 3003, and registers the connection information of the client PC 10a.

Next, the user A inputs the user information "AAA" to the data output apparatus 20 and logs in to the data output apparatus 20 (steps S100 to S104 in FIG. 8). The data output apparatus 20 generates the first authentication information based on the user information "AAA".

The data output apparatus 20 adds the user information "AAA" as the first user information to the connection information request to request the connection information, and transmits the user information "AAA" added the connection information to the management server 30 (step S111 in FIG. 8). In response to the connection information request, the management server 30 acquires the connection information associated with the user information "AAA" added to the connection information request from the registered connection information (step S112 in FIG. 8) and transmits acquired connection information to the data output apparatus 20 (step S113 in FIG. 8). The data output apparatus 20 executes connection processing to the client PC 10a using the connection information transmitted from the management server 30 (step S114).

Processing to designate a folder for storing a file of the output data output from the data output apparatus 20 according to the first variation of the embodiment is as follows. In response to the user operation to the OP 22 (step S120 in FIG. 8), via the folder browse unit 223 (step S121 in FIG. 8), the data output apparatus 20 transmits the request for the folder information for folder browsing to the client PC 10a (step S122). In step S122, the data output apparatus 20 transmits the first authentication information generated based on the user information "AAA" at the time of login of the user A and added the request for the folder information to the client PC 10a.

The client PC 10a receives the request for the folder information transmitted from the data output apparatus 20, stores the first authentication information added to the request for the received folder information, for example, in the RAM 1002, transmits the first authentication information to the authentication server 31, and requests the authentication server 31 to perform authentication based on the first authentication information (step S123 and step S124 in FIG. 8). The authentication server 31 executes the authentication processing based on this first authentication processing, and returns the authentication result indicating the authentication success to the client PC 10a (step S125 and step S126 in FIG. 8) when the authentication succeeds.

Upon receiving the authentication result indicating the success of the authentication from the authentication server 31, the authentication processing unit 121 in the client PC 10a determines whether the first authentication information that results in the success of the authentication and the second authentication information based on the second user information input by the user when the user login to the client PC 10a have a predetermined relationship (step S127 in FIG. 8).

In the first variation of the embodiment, the authentication processing unit 121 extracts the user information "AAA" which is the first user information from the first authentication information. The authentication processing unit 121 refers to the association information stored in advance and acquires other user information associated with the user information "AAA". The authentication processing unit 121 determines whether the acquired other user information matches the user information "BBB" which is the second user information used by the user A to log in to the client PC 10a. In this case, the predetermined relationship between the first authentication information and the second authentication information is a relationship in which the other user information associated with the user information "AAA" as the first user information by the association information and the user information "BBB" which is the second user information match.

In this example, as described above, the association information stored by the authentication processing unit 121 is information in which the user information "AAA" and the user information "BBB" are associated. Therefore, the authentication processing unit 121 acquires the user information "BBB" as another user information associated with the user information "AAA", and can determine that the first authentication information and the second authentication information have a predetermined relationship.

The processing when the authentication processing unit 121 determines that the first authentication information and the second authentication information have a predetermined relationship is the same as the processing after step S128 in the sequence diagram of FIG. 8 described in the embodiment. Therefore, the description thereof is omitted.

Thus, in the first variation of the embodiment, even when the same user A uses different user information for login to the data output apparatus 20 and login to the client PC 10a, as in the above embodiment, with the folder on the client PC 10a secured, it is possible to directly save the output data of the data output apparatus 20 from the data output apparatus 20 to the folder on the client PC 10a.

Second Variation

In a second variation, logging in to the data output apparatus 20 is performed using an Integrated Circuit (IC) card.

The IC card is a card shaped device including a nonvolatile memory, a memory controller to control reading of data from the memory, and a short-distance wireless communication unit that includes an antenna to perform communication by Near Field radio Communication (NFC). The NFC is a wireless communication method to perform the communication at an extremely short distance of about several cm to 1 m. In the IC card, a card ID which is unique identification information for each IC card, for example, is stored in the memory in a nonvolatile manner. The data output apparatus 20 having a communication device that can communicate with the short-distance wireless communication unit of the IC card can execute the authentication processing using the card ID stored in the memory of the IC card as the first user information.

Figure 12:
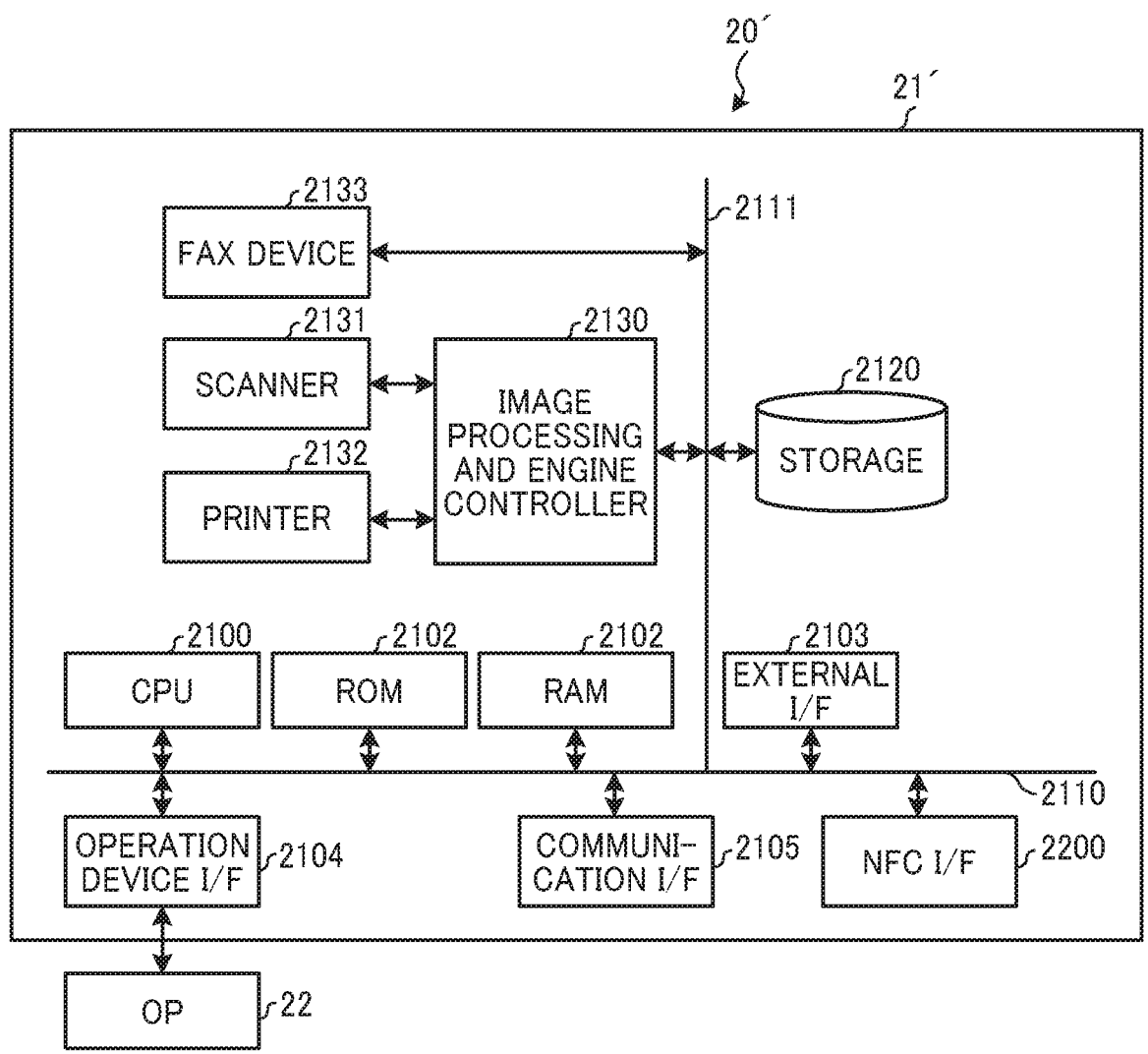
FIG. 12 is a block diagram illustrating a hardware configuration of a multifunction printer (MFP) as a data output apparatus according to a second variation.

FIG. 12 illustrates an example of a hardware configuration of a data output apparatus 20' including the communication device capable of communicating with the IC card, which is applicable to the second variation of the embodiment. In FIG. 12, the same parts as those of FIG. 3 described above are denoted with the same reference numerals, and detailed description thereabout is omitted. To avoid complication, the following description is given focusing on differences from the above-mentioned embodiment with reference to FIGS. 1 to 11.

In FIG. 12, the data output apparatus 20' includes an NFC I/F 2200 as the communication device capable of communicating with the IC card in the main body 21'. The NFC I/F 2200 includes a communication part to transmit and receive signals of the wireless communication by NFC. When the user brings the IC card close to the communication part, the NFC I/F 2200 communicates the short-distance wireless communication unit of the IC card, obtains information stored in the memory of the IC card, and transmits the information to the bus 2110.

In such a configuration, for example, in the client PC 10a, the authentication processing unit 121 stores association information in which the user information input when the user logs in the client PC 10a as the second user information is associated with the card ID of the user's IC card in advance.

Prior to the processing according to the sequence diagram of FIG. 8, the user logs in to the client PC 10a using the user information as the second user information as in the above-described embodiment. In response to the user's log in, the client PC 10a registers connection information for the data output apparatus 20 to connect and communicate to the client PC 10a via the network 2 in the management server 30. At this time, the client PC 10a transmits the connection information to the management server 30 together with the card ID that is the first user information used when the user logs in to the data output apparatus 20.

The management server 30 associates the connection information transmitted from the client PC 10a with the card ID, stores the connection information, for example, in the memory 3003, and registers the connection information of the client PC 10a.

Next, the user brings the IC card close to the communication part of the NFC I/F 2200 in the data output apparatus 20'. This requests logging in to the data output apparatus 20'. This corresponds to step S100 in FIG. 8. The NFC I/F 2200 communicates with the IC card by short-range wireless communication and obtains the card ID stored in the memory of the IC card from the IC card.

The authentication processing unit 210 in the data output apparatus 20' generates the first authentication information based on the card ID obtained from the IC card, transmits the generated first authentication information to the authentication server 31, and requests authentication processing (step S101 and step S102 in FIG. 8). When the authentication by the authentication server 31 is successful, login of the user to the data output apparatus 20' is completed (step S103 and step S104 in FIG. 8).

The data output apparatus 20 adds the card ID to the connection information request to request the connection information, and transmits the card ID added the connection information to the management server 30 (step S111 in FIG. 8). In response to the connection information request, the management server 30 acquires the connection information associated with the card ID added to the connection information request from the registered connection information (step S112 in FIG. 8) and transmits acquired connection information to the data output apparatus 20' (step S113 in FIG. 8). The data output apparatus 20' executes connection processing to the client PC 10a using the connection information transmitted from the management server 30 (step S114).

Processing to designate a folder for storing a file of the output data output from the data output apparatus 20' according to the second variation of the embodiment is as follows. In response to the user operation to the OP 22 (step S120 in FIG. 8), via the folder browse unit 223 (step S121 in FIG. 8), the data output apparatus 20' transmits the request for the folder information for folder browsing to the client PC 10a (step S122). In step S122, the data output apparatus 20' transmits the first authentication information generated based on the card ID obtained from the IC card at the time of login of the user and added the request for the folder information to the client PC 10a.

The client PC 10a receives the request for the folder information transmitted from the data output apparatus 20', stores the first authentication information added to the request for the received folder information, for example, in the RAM 1002, transmits the first authentication information to the authentication server 31, and requests the authentication server 31 to perform authentication based on the first authentication information (step S123 and step S124 in FIG. 8). The authentication server 31 executes the authentication processing based on this first authentication processing, and returns the authentication result indicating the authentication success to the client PC 10a (step S125 and step S126 in FIG. 8) when the authentication succeeds.

Upon receiving the authentication result indicating the success of the authentication from the authentication server 31, the authentication processing unit 121 in the client PC 10a determines whether the first authentication information that results in the success of the authentication and the second authentication information based on the user information input by the user when the user login to the client PC 10a have a predetermined relationship (step S127 in FIG. 8).

In the second variation of the embodiment, the authentication processing unit 121 extracts the card ID from the first authentication information. The authentication processing unit 121 refers to the association information stored in advance and acquires the user information associated with the card ID. The authentication processing unit 121 determines whether the user information acquired based on the card ID matches the second user information used by the user to log in to the client PC 10*a*. In this case, the predetermined relationship between the first authentication information and the second authentication information is a relationship in which the user information associated with the card ID by the association information and the second user information used by the user to log in to the client PC 10*a* match.

In this example, as described above, the association information stored by the authentication processing unit 121 is information in which the card ID as the first user information and the second user information used by the user to log in to the client PC 10*a* are associated. Therefore, the authentication processing unit 121 acquires the second user information as the user information associated with the card ID, and can determine that the first authentication information and the second authentication information have the predetermined relationship.

The processing when the authentication processing unit 121 determines that the first authentication information and the second authentication information have a predetermined relationship is the same as the processing after step S128 in the sequence diagram of FIG. 8 described in the embodiment. Therefore, the description thereof is omitted.

Thus, in the second variation of the embodiment, even when the user uses the IC card stored the card ID for login to the data output apparatus 20', as in the above embodiment, with the folder on the client PC 10*a* secured, it is possible to directly save the output data of the data output apparatus 20' from the data output apparatus 20' to the folder on the client PC 10*a*.

Third Variation

In the above-described embodiment, the first variation, and the second variation of the embodiment, the authentication processing unit 121 in the client PC 10*a* determines whether the first authentication information and the second authentication information have the predetermined relationship. On the other hand, in a third variation of the embodiment, this determination is performed outside the client PC 10*a*.

To avoid complication, the following description is given focusing on differences from the above-mentioned embodiment with reference to FIGS. 1 to 11.

As an example, an example in which the authentication server 31 determines whether the first authentication information and the second authentication information have the predetermined relationship is described with reference to the sequence diagram of FIG. 8. In the sequence diagram of FIG. 8, the processing of step S100 to step S122 is the same as that of the above-described embodiment. Therefore, the description thereof is omitted.

The authentication processing unit 121 in the client PC 10*a* receives the request for the folder information transmitted from the data output apparatus 20 (step S122 in FIG. 8), stores the first authentication information added to the request for the received folder information, for example, in the RAM 1002, transmits the first authentication information to the authentication server 31, and requests the authentication server 31 to perform authentication based on the first authentication information (step S123 and step S124 in FIG. 8). Additionally, the authentication processing unit 121 transmits the second authentication information based on the second user information input by the user when logging in to the client PC 10*a* to the authentication server 31.

The authentication server 31 executes the authentication process based on the first authentication information in response to the request of the authentication process transmitted from the authentication processing unit 121. When the authentication succeeds, the authentication server 31 determines whether the first authentication information showing the successful authentication and the second authentication information transmitted from the authentication processing unit 121 have the predetermined relationship (step S127 in FIG. 8). The authentication server 31 transmits a determination result as to whether the first authentication information and the second authentication information have a predetermined relationship to the client PC 10*a* (step S128 in FIG. 8). The folder management unit 123 in the client PC 10*a* receives the determination result.

The processing after the folder management unit 123 in the client PC 10*a* receives the determination result is the same as the processing after step S128 in the sequence diagram of FIG. 8 described in the embodiment. Therefore, the description thereof is omitted.

Thus, in the third variation of the embodiment, even when the determination that determines whether the first authentication information and the second authentication information have the predetermined relationship is performed outside the client PC 10*a*, as in the above embodiment, with the folder on the client PC 10*a* secured, it is possible to directly save the output data of the data output apparatus 20 from the data output apparatus 20 to the folder on the client PC 10*a*.

In the above description, the authentication server 31 executes the determination that determines whether the first authentication information and the second authentication information have the predetermined relationship, but the present disclosure is not limited to this. That is, if the client PC 10*a* can receive the determination result of the determination, for example, the management server 30 or another server device connected to the client PC 10*a* and the data output apparatus 20 via the network 2 may execute the determination process.

The third variation of the embodiment may be implemented in combination with the first variation and the second variation of the above-described embodiment.

The embodiment and variations described above are preferred example embodiments of the present disclosure, and various applications and variations may be made without departing from the scope of the present disclosure. For example, elements and/or features of different illustrative embodiments may be combined with each other and/or substituted for each other within the scope of the present disclosure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An information processing system comprising:
a data output apparatus;
an information processing apparatus; and
at least one server,
the data output apparatus including one or more processors and one or more memories to store a plurality of instructions which, when executed by the one or more processors of the data output apparatus, cause the one or more processors of the data output apparatus to:

receive a first authentication information of a user input at the data output, apparatus;

request authentication from the at least one server based on the first authentication information; and transmit, to the information processing apparatus, the first authentication information authenticated in response to the authentication request, and a transmission request indicating one or more storage locations corresponding to the first authentication information in the information processing apparatus to store data output from the data output apparatus;

the information processing apparatus including one or more processors and one or more memories to store a plurality of instructions which, when executed by the one or more processors of the information processing apparatus, cause the one or more processors of the information processing apparatus to:

receive a second authentication information input at the information processing apparatus;

request authentication from the at least one server based on the second authentication information;

determine whether the second authentication information, authenticated in response to the authentication requested and the first authentication information transmitted from the data output apparatus, have a defined relationship; and transmit information indicating the one or more storage locations to the data output apparatus based on a determination that the first authentication information and the second authentication information have the defined relationship.

2. The information processing system of claim 1, wherein the one or more processors of the information processing apparatus are further configured to:

set the one or more storage locations in response to a user operation, and transmit information indicating the set one or more storage locations to the data output apparatus.

3. The information processing system of claim 2, wherein the one or more processors of the data output apparatus are further configured to:

display a screen that displays the one or more storage locations based on the information indicating the one or more storage locations, transmitted from the information processing apparatus; and receive a designation of at least one storage location at which output data of the data output apparatus is to be stored, the at least one storage location being one or more of the one or more storage locations and storage locations in a directory layer under a directory layer of the one or more storage locations.

4. The information processing system of claim 2, wherein the one or more processors of the information processing apparatus are further configured to manage the information indicating the one or more storage locations in association with identification information corresponding to the second authentication information.

5. The information processing system of claim 1, wherein the one or more processors of the information processing apparatus are further configured to transmit identification information corresponding to the second authentication information, connection information for the data output apparatus to connect the information processing apparatus, and a registration request that requests registration of the connection information, wherein the one or more processors of the data output apparatus are further configured to transmit the authenticated first authentication information and a connection information request that requests the connection information, wherein the at least one server includes a management server connectable to the data output apparatus, wherein the management server comprises:

one or more processors; and one or more memories to store a plurality of instructions which, when executed by the one or more processors of the management server, cause the one or more processors of the management server to:

register the identification information and the connection information in association with each other, in response to the identification information, the connection information, and the registration request, respectively transmitted from the information processing apparatus, and transmit, to the data output apparatus, the connection information registered in association with the identification information corresponding to the second authentication information, the second authentication having the defined relationship with the first authentication information.

* * * * *